(12) United States Patent
Gudimalla et al.

(10) Patent No.: US 10,988,076 B2
(45) Date of Patent: Apr. 27, 2021

(54) STEERING COLUMN CONTROL MODULE

(71) Applicant: KELSEY-HAYES COMPANY, Livonia, MI (US)

(72) Inventors: Sudhakar Gudimalla, Farmington Hills, MI (US); Madan Mohan Padarthi, Canton, MI (US); Vivek V. Mohile, West Bloomfield Township, CT (US); Jeffrey Wiersing, Walled Lake, MI (US); Roberto Tomassi, Livonia, MI (US)

(73) Assignee: BCS AUTOMOTIVE INTERFACE SOLUTIONS US LLC, Wilmington, DE (US)

( * ) Notice: Subject to any disclaimer, the term of this patent is extended or adjusted under 35 U.S.C. 154(b) by 382 days.

(21) Appl. No.: 15/921,486

(22) Filed: Mar. 14, 2018

(65) Prior Publication Data

US 2018/0264996 A1 Sep. 20, 2018

Related U.S. Application Data

(60) Provisional application No. 62/471,085, filed on Mar. 14, 2017.

(51) Int. Cl.
| | |
|---|---|
| *H01H 36/00* | (2006.01) |
| *B60Q 1/14* | (2006.01) |
| *G05G 1/015* | (2008.04) |
| *G05G 1/02* | (2006.01) |
| *G05G 13/00* | (2006.01) |
| *G05G 1/08* | (2006.01) |
| *G05G 1/04* | (2006.01) |

(52) U.S. Cl.
CPC .......... *B60Q 1/1476* (2013.01); *G05G 1/015* (2013.01); *G05G 1/02* (2013.01); *G05G 13/00* (2013.01); *H01H 36/00* (2013.01); *G05G 1/04* (2013.01); *G05G 1/08* (2013.01)

(58) Field of Classification Search
CPC ................ B60Q 1/1469; B60Q 1/1476; H01H 36/00–36/02
See application file for complete search history.

(56) References Cited

U.S. PATENT DOCUMENTS

| | | | |
|---|---|---|---|
| 5,780,795 A | 7/1998 | O'Reilly | |
| 6,175,290 B1 | 1/2001 | Forsythe et al. | |
| 6,873,233 B2 * | 3/2005 | Sugiyama | ............ B60Q 1/1469 335/205 |

FOREIGN PATENT DOCUMENTS

WO    WO-2008067954 A1 *  6/2008    ............. H03K 17/97

* cited by examiner

Primary Examiner — Ramon M Barrera
(74) Attorney, Agent, or Firm — Tarolli, Sundheim, Covell & Tummino LLP

(57) ABSTRACT

A steering column control module includes a stalk assembly pivotably connected to a control module housing. A plurality of magnets is connected to and movable by the stalk assembly. A plurality of sensors senses the positions of the plurality of magnets and sends signals indicating the positions of the magnets. A controller receives the signals to control vehicle functions.

20 Claims, 26 Drawing Sheets

STEERING COLUMN CONTROL MODULE

RELATED APPLICATIONS

This application claims the benefit of U.S. Appln. Ser. No. 62/471,085, filed Mar. 14, 2017, the entirety of which is incorporated herein by reference.

FIELD OF THE INVENTION

The present invention is directed to a steering column control module and, more specifically, to a steering column control module with at least one stalk assembly for controlling at least one vehicle function.

BACKGROUND

A steering column of a vehicle has one or more controls mounted on a stalk assembly or lever for controlling functions of the vehicle. The stalk assembly can be pivotably attached to the steering column and used to control left and right turn signals, wipers and/or wiper fluid pumps. The stalk assembly can also include buttons and/or knobs for controlling headlights of the vehicle, high beams, front wipers and/or a rear wiper. The stalk assembly typically uses electrical contact switches to control the vehicle functions.

SUMMARY

In one aspect of the invention, a steering column control module includes a stalk assembly pivotably connected to a control module housing. A plurality of magnets is connected to and movable by the stalk assembly. A plurality of sensors senses the positions of the plurality of magnets and sends signals indicating the positions of the magnets. A controller receives the signals to control vehicle functions.

In another aspect of the invention, a steering column control module includes a stalk assembly pivotably connected to a control module housing. First and second magnets are connected to and movable by the stalk assembly. A cable assembly extends into the stalk assembly and includes a plurality of portions. First and second sensors are provided on the plurality of portions of the cable assembly for continuously sensing the positions of the first and second magnets and sending signals indicating the positions of the magnets. A controller receives the signals to control vehicle functions.

DETAILED DESCRIPTION

Figure 1:
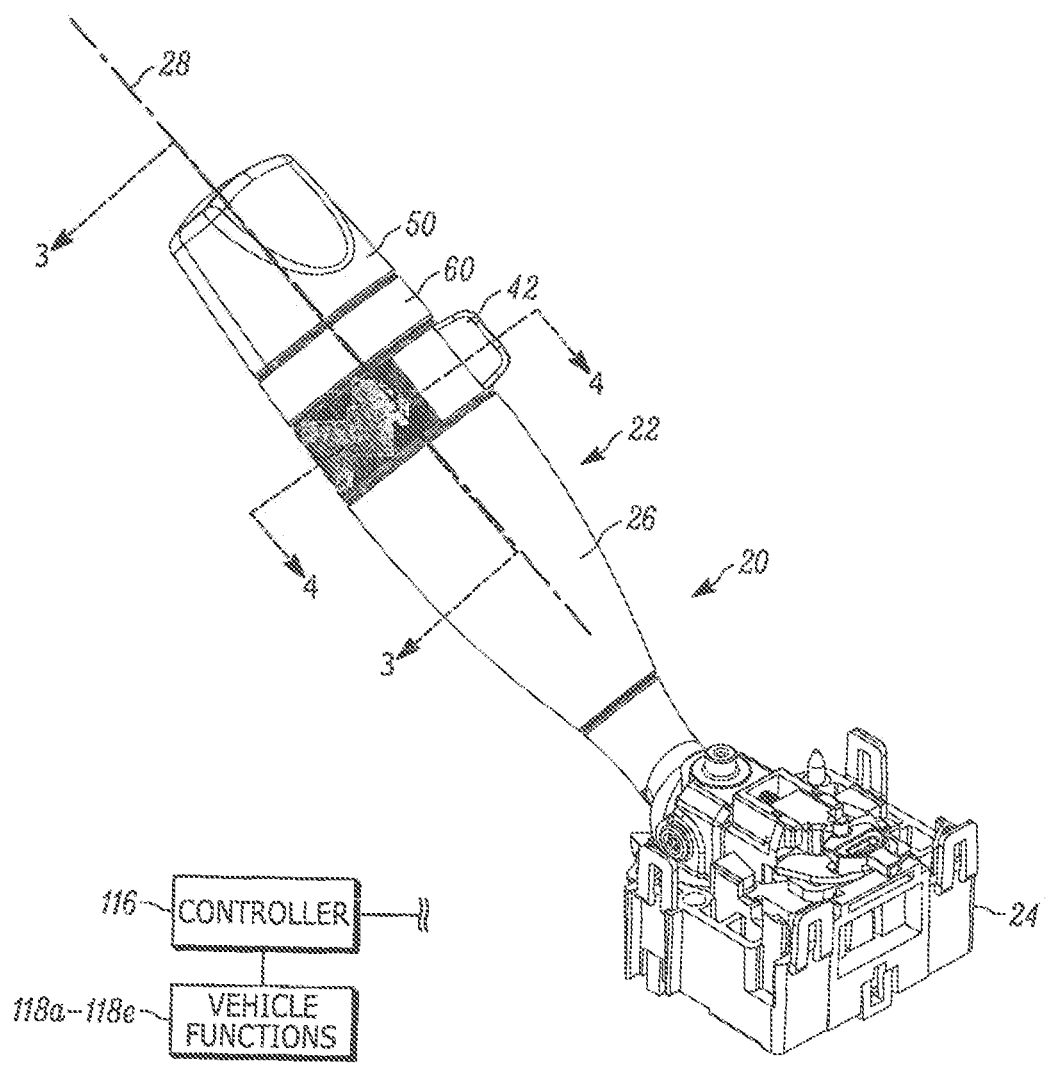
FIG. 1 is a side view of a steering column control module in accordance with an embodiment of the present invention.
Figure 2:
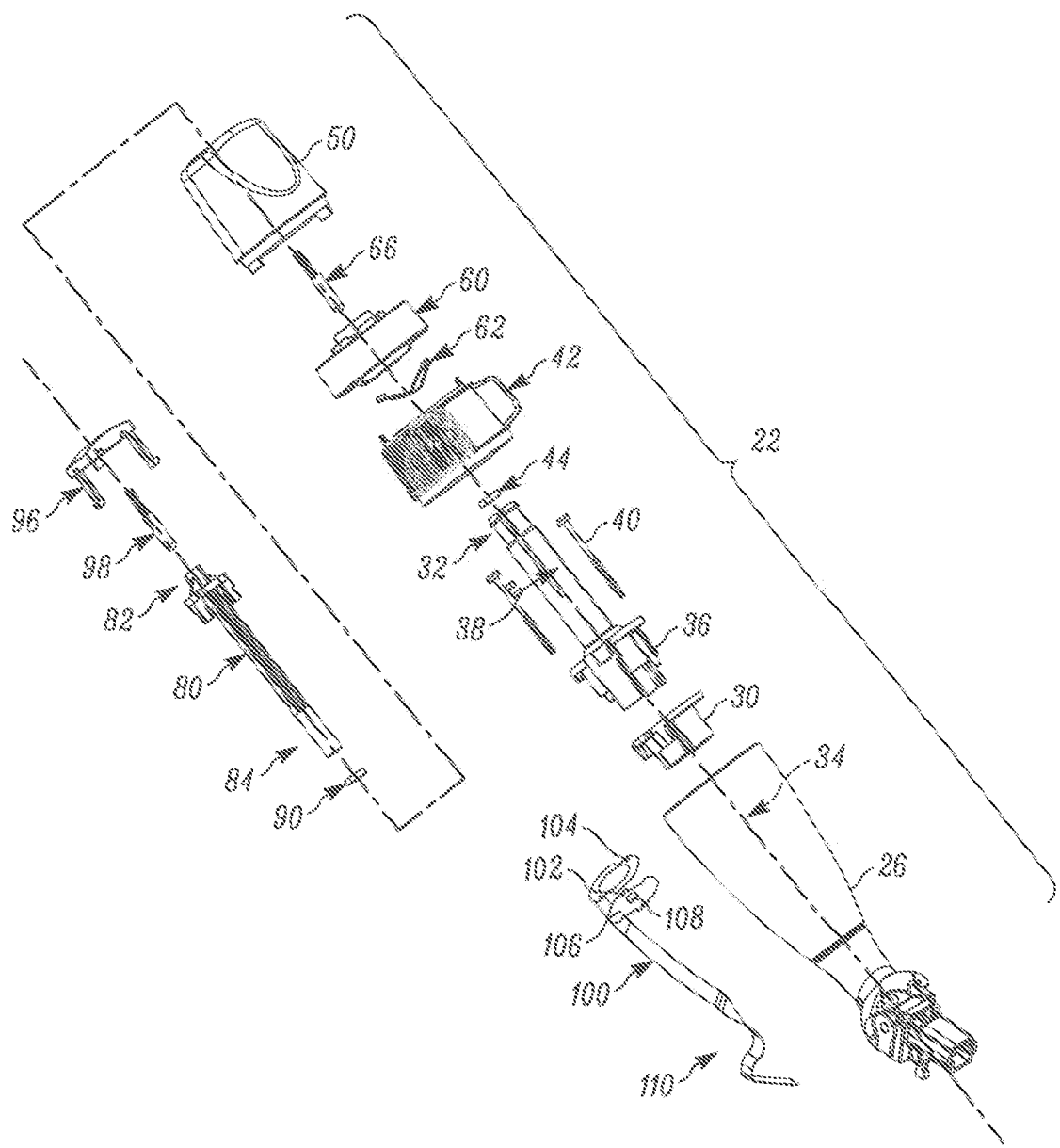
FIG. 2 is an exploded view of a stalk assembly of the steering column control module of FIG. 1.

The present invention is directed to a steering column control module and, more specifically, to a steering column control module with at least one stalk assembly for controlling at least one vehicle function. FIGS. 1-2 illustrate an example steering column control module 20 that includes a stalk or lever assembly 22 and a steering column control module housing 24. The stalk assembly 22 includes a housing 26 pivotably connected to the control module housing 24. The housing 26 extends from the control module housing 24 along an axis or centerline 28.

Figure 3:
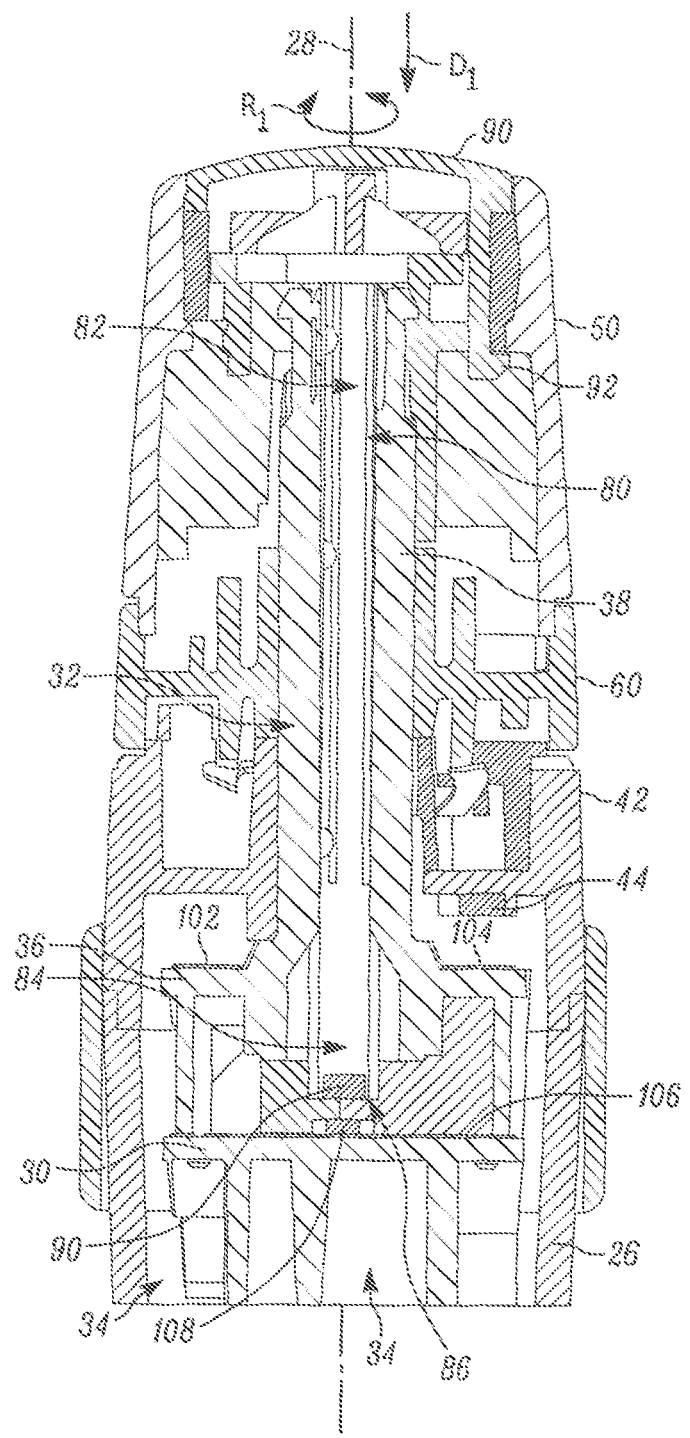
FIG. 3 is a section view of the stalk assembly of FIG. 1 taken along line 3-3.

Referring to FIGS. 2-3, the stalk assembly 22 includes a support member or disc 30 positioned in a recess 34 in the housing 26. A first shaft 32 includes a base 36 and a projection 38 extending from the base. The base 36 is positioned within the recess 34 and abuts the support member 30. Fasteners 40, such as screws, extend through the base 36 and the support member 30 into the housing 26 to secure the base, support member, and housing together. The projection 38 extends out of the housing 26 and along the axis 28.

A first knob 42 is supported on the projection 38 for rotation about the axis 28 relative to the projection and the housing 26. A magnet 44 is connected to the first knob 42 in proximity with or adjacent to the base 36. The magnet 44 rotates with the first knob about the axis 28. A second knob 50 is supported on the projection 38 for rotation about the axis 28 relative to the first knob 42, projection 34, and housing 26. A ring member 60 is fixed to the projection 38 and positioned axially between the first and second knobs 42, 50. Both knobs 42, 50 are therefore rotatable about the axis 28 relative to the ring member 60. Each of the first knob 42, second knob 50, and ring member 60 can have a snap-in or detent connection with the projection 38 that prevents relative axial movement therebetween.

A spring detent 62 encircles the projection 34 and engages the ring member 60 and the first knob 42. The spring detent 62 is fixed to and rotatable with the first knob 42 relative to the ring member 60. The spring member 62 is configured to cooperate with recesses or detent structure (not shown) on the ring member 60 to hold the first knob 42 in predetermined rotational positions relative to the housing 26.

A spring plunger assembly 66 is secured to the second knob 50 and rotatable therewith relative to the ring member 60. The spring plunger assembly 66 is configured to cooperate with recesses or detent structure (not shown) on the ring member 60 to hold the second knob 50 in predetermined rotational positions relative to the housing 26.

The stalk assembly 22 further includes a second shaft 80 extending from a first end 82 to a second end 84. The second shaft 80 extends along the axis 28 through the projection 38, second knob 50, ring member 60, and first knob 42 into the recess 34 in the housing 26.

The second shaft 80 is axially movable relative to the first shaft 32, the knobs 42, 50, and the ring member 60. The second shaft 80 is rotatable with the second knob 50 about the axis 28 relative to the first shaft 32, first knob 40, ring member 60, and support member 30.

A button 96 is received in the second knob 50 and secured to the first end 82 of the second shaft 80. Since the second knob 50 and second shaft 80 are rotatably fixed together, the button 96 is rotatable with the second knob and second shaft about the axis 28. The button 96 is axially movable with the second shaft 80 relative to the second knob 50.

A spring plunger assembly 98 engages the second end 84 of the second shaft 80 and the underside of the button 96. The spring plunger assembly 98 biases the second shaft 80 and button 96 axially away from the support member 30 such that the button has an initial position shown in FIG. 3 substantially aligned with the top of the second knob 50. The button 96 includes a latch 92 that cooperates with the second knob 50 to keep the button within the second knob.

The second end 84 of the second shaft 80 includes a recess 86 for receiving a magnet 90. The magnet 90 is fixed to the second shaft 80 and movable therewith. The bias of the spring plunger assembly 98 axially spaces the magnet 90 from the support member 30 when the button 96 is in the initial position.

The stalk assembly 22 further includes a flexible cable assembly 100 having a first portion 102 and a second portion 106. The first and second portions 102, 106 can be printed circuit boards (PCBs). The first portion 102 is secured to a surface of the base 36 facing the magnet 44. A first sensor 104 is connected to the first portion 102. The second portion 106 is secured to a surface of the support member 30 facing the magnet 90. A second sensor 108 is connected to the second portion 106 and aligned with the magnet 90 along the axis 38. The first and second sensors 104, 108 can be Hall effect sensors, such as Hall effect micro chips. An end 110 of the cable assembly 100 is connected to a controller 116 (see FIG. 1) for sending signals from the sensors 104, 108 to the controller.

Figure 4:
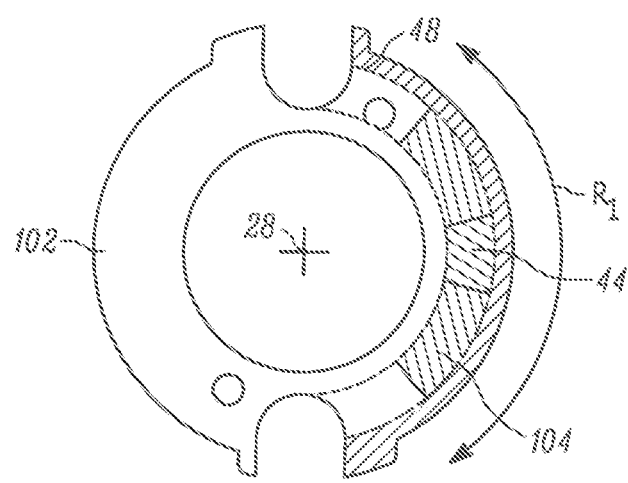
FIG. 4 is a section view of a portion of the stalk assembly of FIG. 1 taken along line 4-4.

Referring to FIGS. 3-4, rotating the first knob 42 about the axis 28 in the manner $R_1$ causes the magnet 44 to move along a circumferential path 48 relative to the first sensor 104. The first sensor 104 continuously senses the position of the magnet 44 along the path 48 and sends a signal to the controller 116 indicative of the position. In response, the controller 116 controls at least one first vehicle function 118a, e.g., the front fog light(s) or rear fog light(s) (see FIG. 1). To this end, it will be appreciated that placing the magnet 44 in different positions along the path 48 can correspond with controlling different fog lights 118a.

For example, the first knob 42—and therefore the magnet 44—has a neutral position shown in FIG. 4 in which all the fog lights 118a are unactuated/off. Rotating the first knob 42 counterclockwise from the neutral position in the manner $R_1$ moves the magnet 44 to the top end of the path 48 (as shown in FIG. 4). This causes the controller 116 to actuate the front fog light(s) 118a.

Rotating the first knob 42 clockwise from the neutral position in the manner $R_1$ moves the magnet 44 to the bottom end of the path 48. This causes the controller 116 to actuate the rear fog light(s) 118a. Alternatively, both the front and rear fog lights 118a can be actuated by the controller 116 when the first knob 42 is rotated in a single direction from the neutral position until the magnet 44 reaches an end of the path 48. In each case, the spring detent 62 cooperates with the detent structure (not shown) on the ring member 60 when the first knob 42 reaches either end of the path 48 to maintain the first knob in place. This leaves the fog light(s) 118a associated with that position along the path 48 in the actuated condition. The bias of the spring detent 62 must be overcome to return the magnet 44 to the neutral position of FIG. 4 and turn off all the fog lights 118a.

Figure 5A:
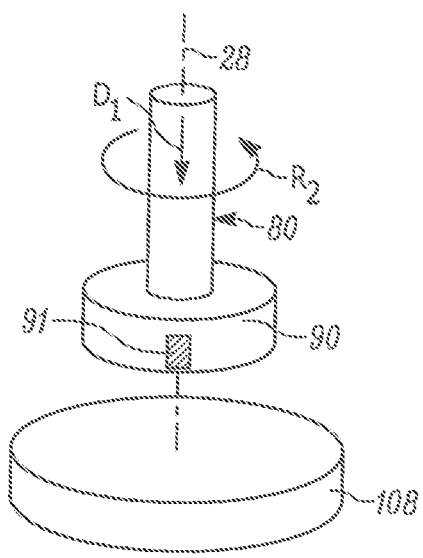
FIG. 5A is a schematic illustration of an enlarged portion of FIG. 3.

Referring to FIGS. 3 and 5A, pressing the button 96 in the manner $D_1$ to overcome the bias of the spring 106 moves the second shaft 80 axially toward the support member 30. This moves the magnet 90 secured to the second shaft 80 axially toward the second sensor 108, thereby reducing an axial gap or distance $g_1$ between the magnet 90 and the second sensor 108. The second shaft 80 extends through and moves relative to the first portion 102.

The second sensor 108 continuously senses the axial gap $g_1$ between the magnet 90 and the second sensor and sends a signal to the controller 116 indicative of the gap. When the gap $g_1$ is reduced to a predetermined value, the controller 116 actuates a second vehicle function 118b, e.g., the automatic high beams. The button 96 and second knob 50 can include cooperating detent structure (not shown) that holds the button and second knob at the predetermined gap $g_1$ value until the button is depressed to overcome the detent.

The automatic high beams 118b remain actuated as long as the gap $g_1$ is at [or less than] the predetermined value. Depressing the button 90 again releases the button detent and allows the spring plunger assembly 98 to extend and return the button to the neutral position shown in FIG. 3 while increasing the gap $g_1$ above the predetermined value. That said, the controller 116 turns off the automatic high beams 118b as soon as the gap $g_1$ exceeds the predetermined value.

Figure 5B:
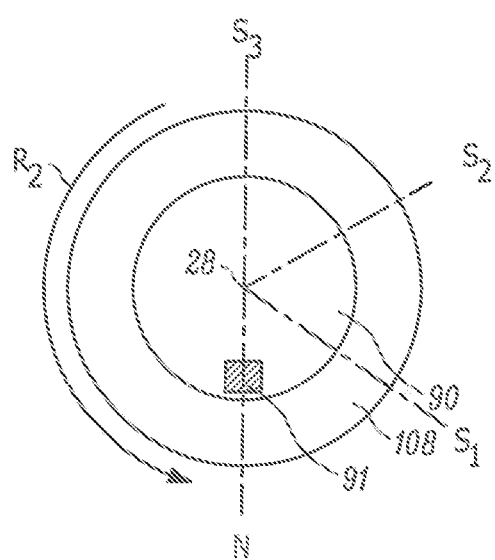
FIG. 5B is a schematic illustration of a top view of FIG. 5A.

Referring to FIGS. 5A-5B, rotating the second knob 50 about the axis 28 in the manner $R_2$ causes the magnet 90 to rotate relative to the second sensor 108. The second sensor 108 continuously senses the rotational position of the magnet 90 and sends a signal to the controller 116 indicative of the rotational position. In response, the controller 116 controls at least one third vehicle function 118c, e.g., the headlights. To this end, it will be appreciated that placing the magnet 90 in different rotational positions relative to the second sensor 108 can correspond with controlling the headlights 118c in different manners.

For example, the second knob 50—and therefore the magnet 90—has a neutral position N shown in FIG. 5B (indicia 91 are shown in FIGS. 5B-5C for clarity) in which the headlights 118c are unactuated/off. The spring plunger assembly 66 snaps into a first recess (not shown) in the ring member 60 when the second knob 50 is in the neutral position to maintain the second knob therein. This keeps the headlights 118c off until the detent is overcome.

Rotating the second knob 50 counterclockwise from the neutral position N in the manner $R_2$ moves the magnet 90 in a counterclockwise direction relative to the second sensor 108 on the second portion 106. Once the indicia 91 reaches a first position $S_1$ the controller 116 actuates the headlights 118c in automatic/continuous mode. The spring plunger assembly 66 snaps into a second recess (not shown) in the ring member 60 when the second knob 50 reaches the first position $S_1$ to maintain the second knob therein. This keeps the headlights 118c on in automatic mode until the detent is overcome.

Rotating the second knob 50 further counterclockwise from the first position $S_1$ in the manner $R_2$ until the indicia 91 reaches a second position $S_2$ causes the controller 116 to switch the headlights 118c from automatic mode to parking mode. The spring plunger assembly 66 snaps into a third recess (not shown) in the ring member 60 when the second knob 50 reaches the second position $S_2$ to maintain the second knob therein. This keeps the headlights 118c on in parking mode.

Rotating the second knob 50 further counterclockwise from the second position $S_2$ in the manner $R_2$ until the indicia 91 reaches a third position $S_3$ causes the controller 116 to switch the headlights 118c from parking mode to hazard mode. The spring plunger assembly 66 snaps into a fourth recess (not shown) in the ring member 60 when the second knob 50 reaches the third position $S_3$ to maintain the second knob therein. This keeps the headlights 118c on in hazard mode.

The second knob 50 can be rotated in a clockwise direction from any of the positions $S_1$-$S_3$ in the manner $R_2$ when the bias of the spring plunger assembly 66 associated with that position is overcome. The second knob 50 can then be placed in a different position $S_1$-$S_3$ or returned to the neutral position N, which turns the headlights 118c off.

It will be appreciated that the different headlight 118c modes can be associated with different positions $S_1$-$S_3$ or that more or fewer headlight modes and/or positions can be provided. Regardless, the second sensor 108 continuously senses the rotational position of the magnet 90 and sends signals to the controller 116 to control the headlights 118c in the desired manner.

Figure 6:
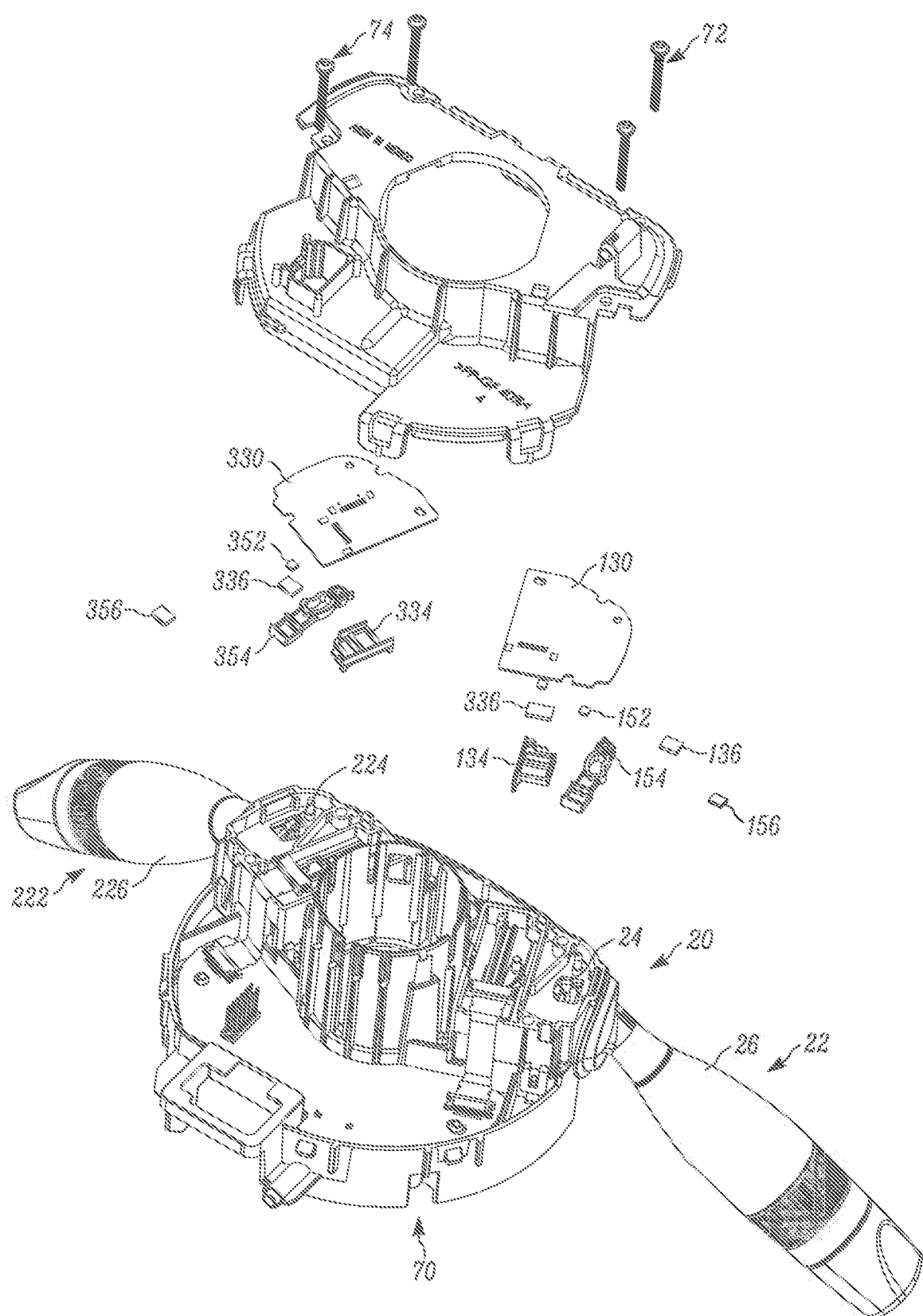
FIG. 6 is an exploded view of a steering column switch housing including the steering column control module of FIG. 1 and an example second steering column control module.

Referring to FIG. 6, the steering column control module 20 is positioned in a steering column switch housing 70 that receives a steering column (not shown). Fasteners 72 secure a cover 74 to the switch housing 70 to enclose and secure the steering column control module 20 within the switch housing. A PCB 130 is connected to the control module housing 24 beneath the cover 74. First and second control module sensors 132, 152 are mounted on the PCB 130. The first and second control module sensors 132, 152 can be Hall effect sensors, such as Hall effect micro chips. First and second carrier members 134, 154 are provided on the PCB 130 and are slidable relative thereto. Magnets 136, 156 are mounted on the carrier members 134, 154, respectively.

Figure 7A:
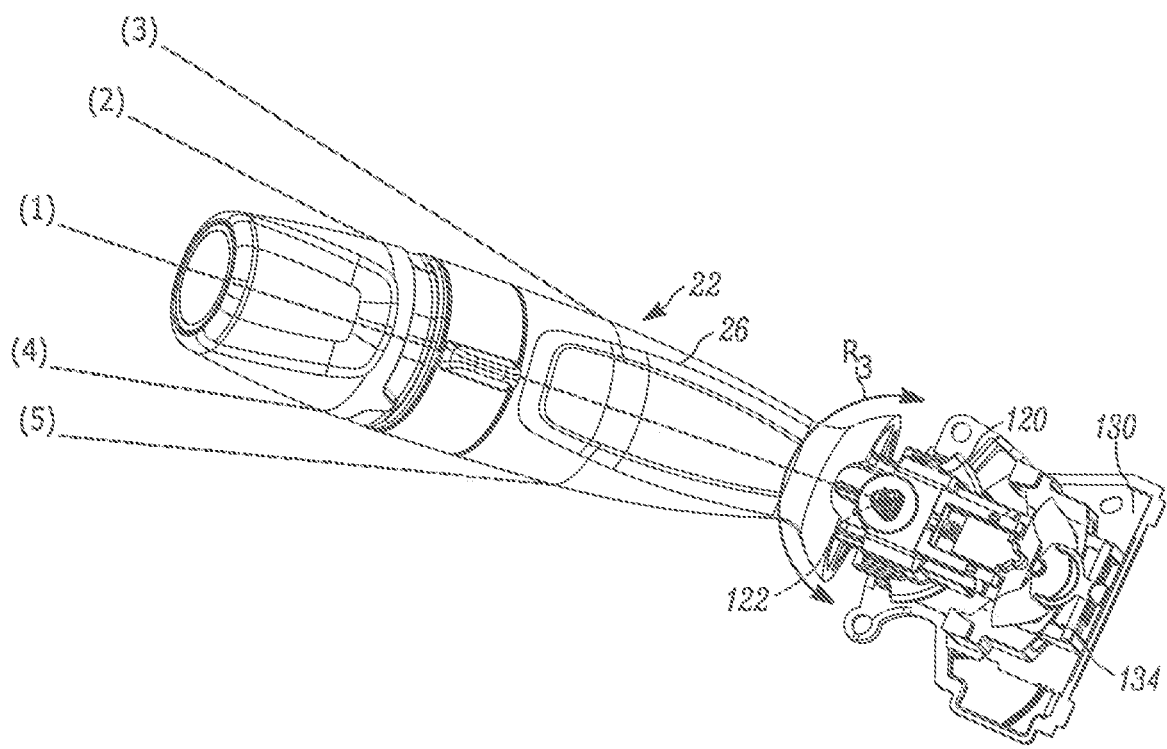
FIG. 7A is a side view of the stalk assembly of FIG. 1 through a first range of motion.
Figure 7B:
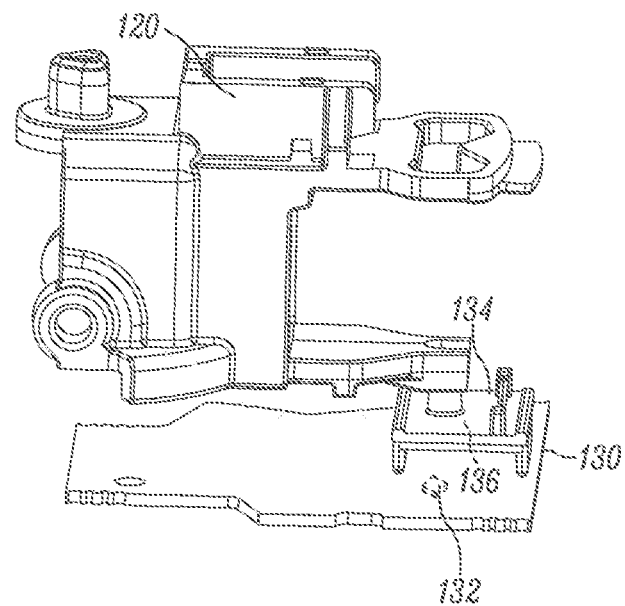
FIG. 7B is an enlarged view of a portion of FIG. 7A.
Figure 7C:
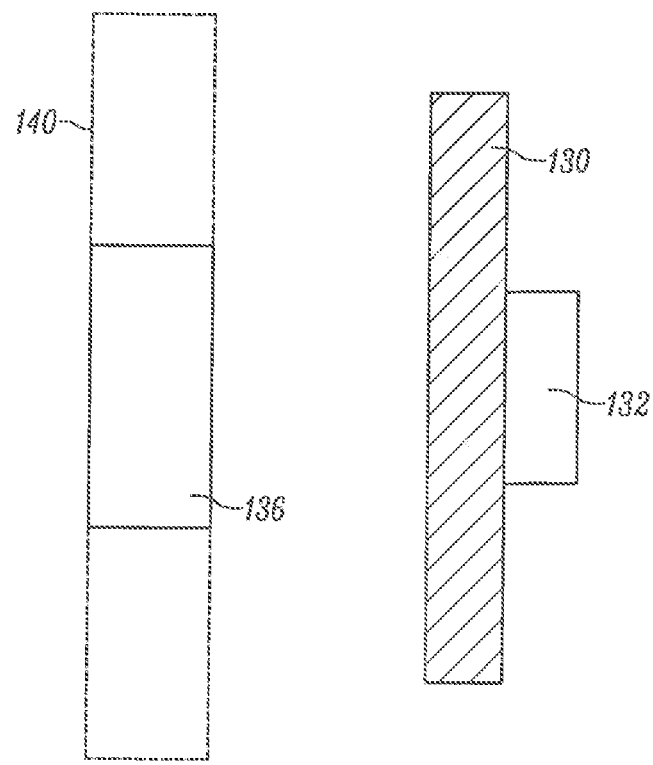
FIG. 7C is a schematic illustration of a first operation of the stalk assembly of FIG. 1.

Referring to FIGS. 7A-7C, the carrier member 134 is connected to the rotor member 120 such that pivotable movement of the stalk housing 26 and rotor member in the manner $R_3$ causes the carrier member to slide across the PCB 130. This results in the magnet 136 moving along a linear path indicated at 140. The control module sensor 132 continuously senses the position of the magnet 136 and sends a signal to the controller 116 indicative of that position. In response, the controller 116 controls at least one fourth vehicle function 118d, e.g., the left turn signal, right turn signal, left lane change signal, and right lane change signal. To this end, it will be appreciated that placing the magnet 136 in different positions along the path 140 can correspond with controlling different fourth vehicle functions 118d.

For example, the stalk housing 26 and rotor member 120—and therefore the magnet 136—has a neutral position indicated at (1) in which all the fourth vehicle functions 118d are unactuated/off. The rotor member 120 and control module housing 24 can include cooperating detent structure (not shown) that holds the stalk housing 26 and rotor member 120 in the position (1) until a sufficient force is applied to the stalk housing in the manner $R_3$ direction to overcome the detent.

Pivoting the stalk housing 26 and rotor member 120 clockwise from the neutral position (1) in the manner $R_3$ moves the magnet 136 downwards along the path 140 (as shown in FIG. 7C). When the stalk housing 26 and rotor member 120 reach the position indicated at (2) in FIG. 7A, the controller 116 actuates the right lane change signal 118d. The right lane change signal 118d remains actuated as long as the stalk housing 26 is physically held in the position (2). If the stalk housing 26 is released, however, the stalk housing and rotor member 120 automatically return to the neutral position (1) under a spring bias (not shown). The right lane change signal 118d will be turned off when the stalk housing 26 moves out of the position (2).

Pivoting the stalk housing 26 and rotor member 120 clockwise from the position (2) in the manner $R_3$ to the position indicated at (3) causes the controller 116 to turn off the right lane change signal 118d and actuate the right turn signal 118d. The rotor member 120 and control module housing 24 can include cooperating detent structure (not shown) that holds the stalk housing 26 and rotor member 120 in the position (3) until a sufficient force is applied to the stalk housing in the counterclockwise direction to overcome the detent and allow the stalk assembly and rotor member return to the neutral position (1). The right turn signal 118d remains actuated until the stalk housing 26 and rotor member 120 are forcibly moved out of the position (3).

Pivoting the stalk housing 26 and rotor member 120 counterclockwise from the neutral position (1) in the manner $R_3$ moves the magnet 136 upwards along the path 140 (as shown in FIG. 7C). When the stalk housing 26 and rotor member 120 reach the position indicated at (4) in FIG. 7A, the controller 116 actuates the left lane change signal 118d. The left lane change signal 118d remains actuated as long as the stalk housing 26 is physically held in the position (4). If the stalk housing 26 is released, however, the stalk housing and rotor member 120 automatically return to the neutral position (1) under a spring bias (not shown). The left lane change signal 118d will be turned off when the stalk housing 26 moves out of the position (4).

Pivoting the stalk housing 26 and rotor member 120 counterclockwise from the position (4) in the manner $R_3$ to the position indicated at (5) causes the controller 116 to turn off the left lane change signal 118d and actuate the left turn signal 118d. The rotor member 120 and control module housing 24 can include cooperating detent structure (not shown) that holds the stalk housing 26 and rotor member 120 in the position (5) until a sufficient force is applied to the stalk housing in the clockwise direction to overcome the detent and allow the stalk assembly and rotor member to return to the neutral position (1). The left turn signal 118d remains actuated until the stalk housing 26 and rotor member 120 are forcibly moved out of the position (5). It will be appreciated that the stalk housing 26 and rotor member 120 can be pivoted to and between any position(s) (1)-(5), as needed.

Figure 8A:
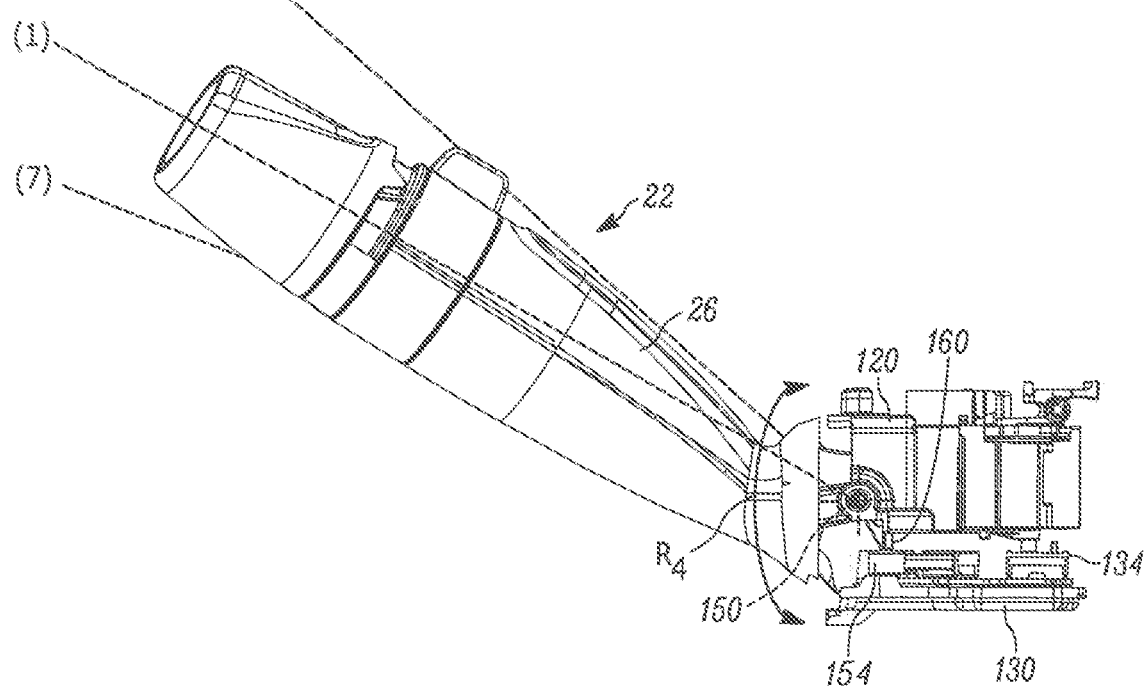
FIG. 8A is a side view of the stalk assembly of FIG. 1 through a second range of motion.
Figure 8B:
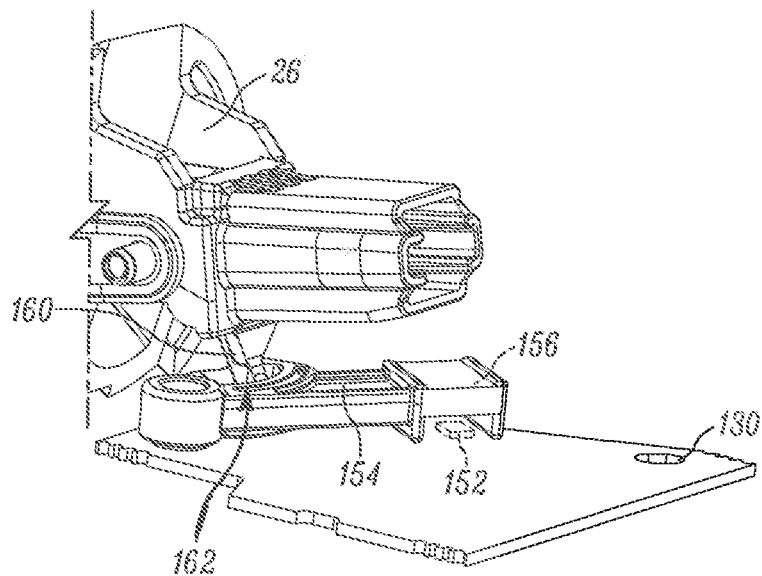
FIG. 8B is an enlarged view of a portion of FIG. 8A.
Figure 8C:
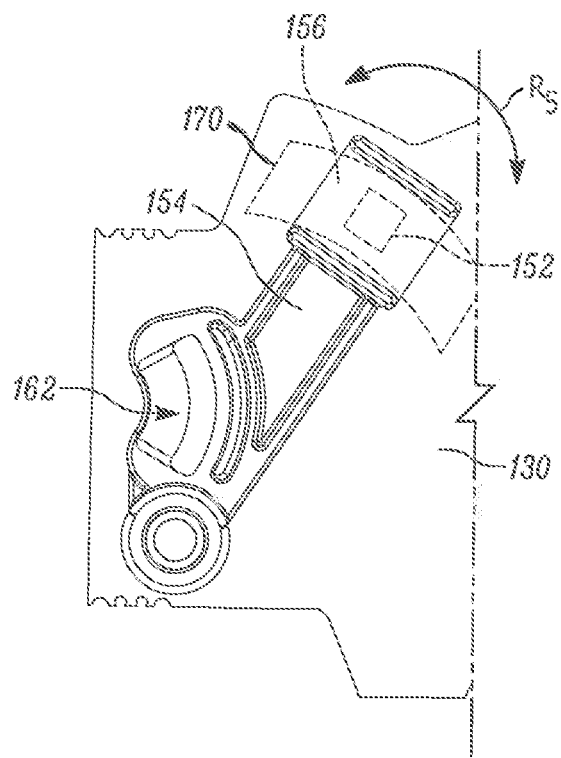
FIG. 8C is a schematic illustration of a second operation of the stalk assembly of FIG. 1.
Figure 9:
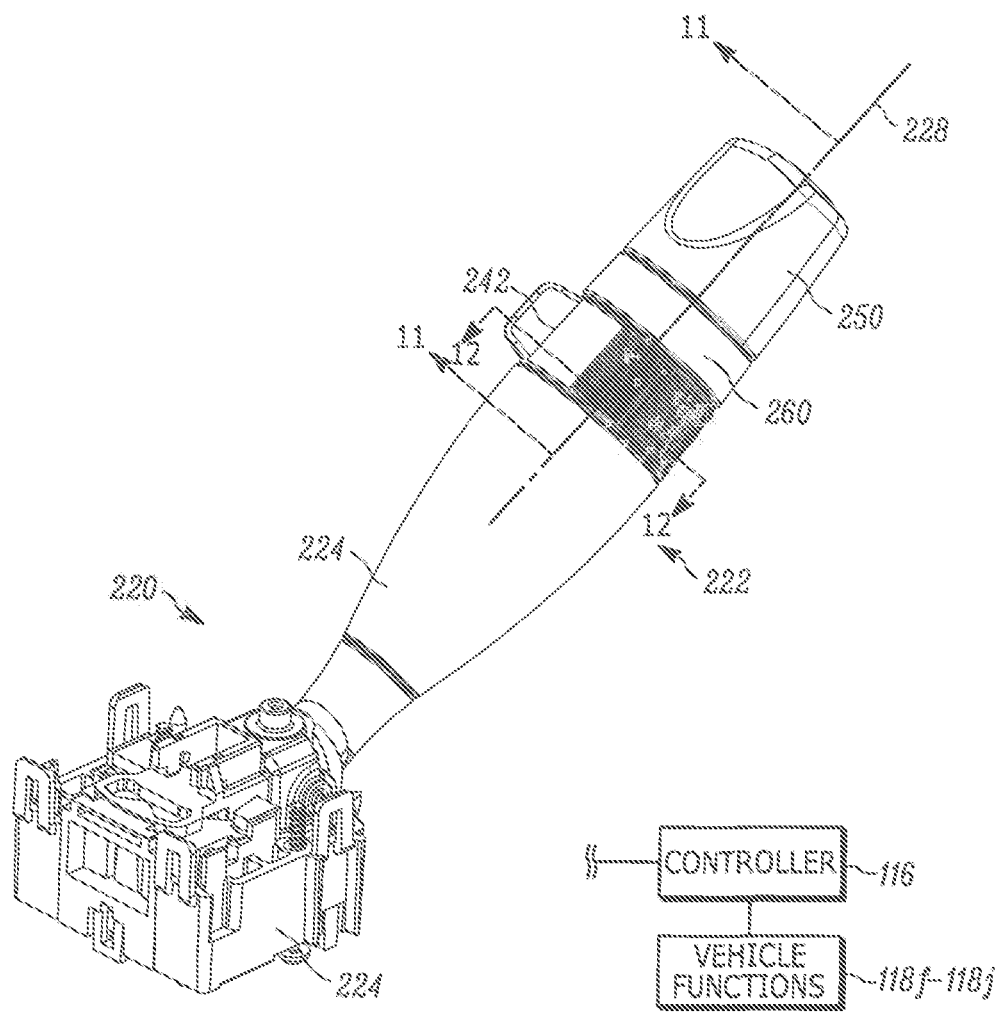
FIG. 9 is a side view of the second steering column control module of FIG. 6.
Figure 10:
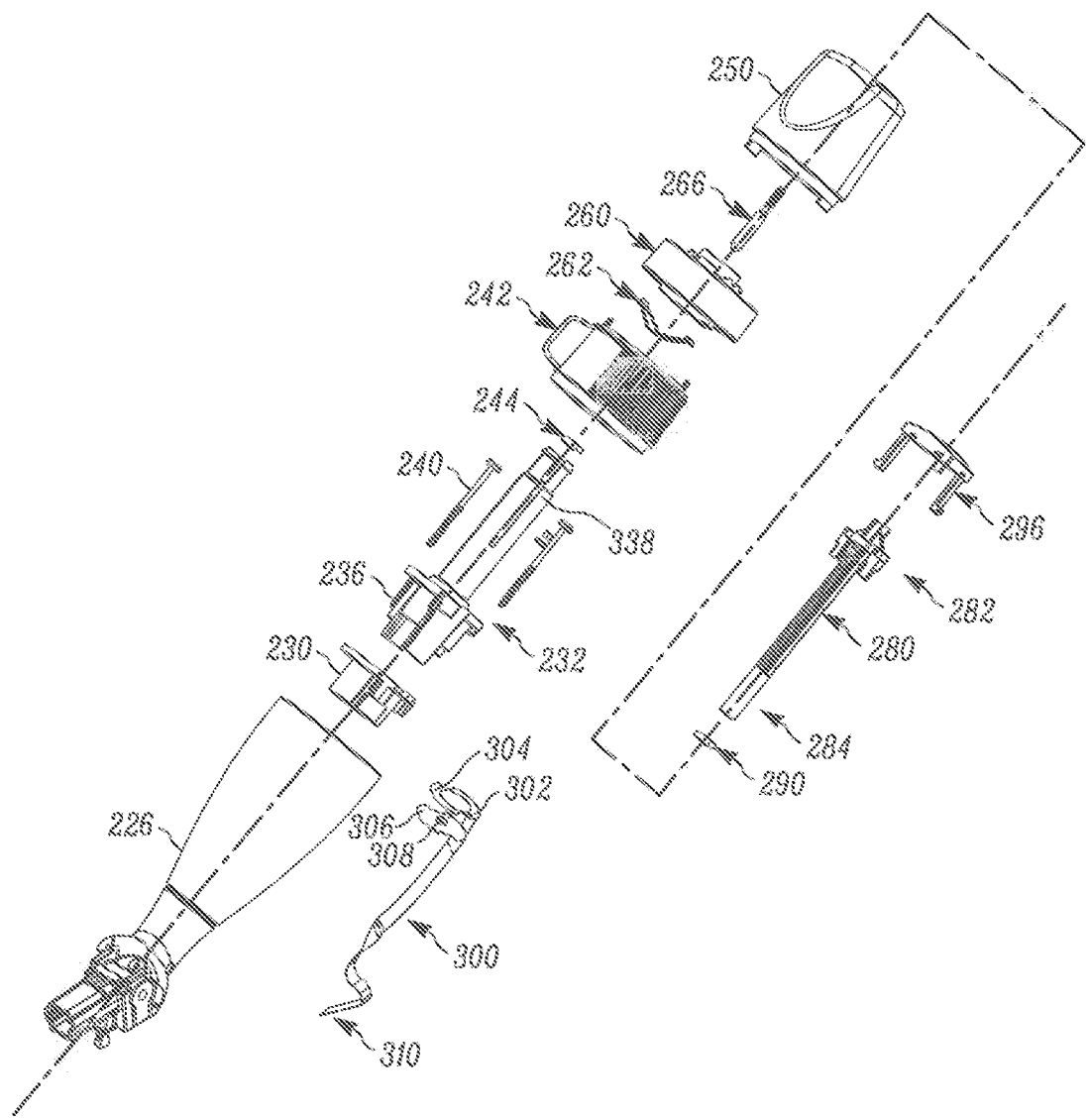
FIG. 10 is an exploded view of a stalk assembly of the second steering column control module of FIG. 9.

Referring to FIGS. 8A-8C, the stalk housing 26 is pivotable relative to the rotor member 120 about a second axis 150 in the manner $R_4$ (FIG. 8A). The carrier member 154 is pivotably connected to the PCB 130 and slidable along/relative thereto. The carrier member 154 is connected to the stalk housing 26 such that pivotable movement of the stalk housing in the manner $R_4$ causes the carrier member to pivot about the PCB 130 in the manner $R_5$ (FIG. 8C). In one example, a projection 160 on the stalk housing 26 extends into a slot 162 in the carrier member 154. Pivoting the stalk housing 26 in the manner $R_4$ moves the projection 160 within and relative to the slot 162, causing the carrier member to pivot in the manner $R_5$. This, in turn, causes the magnet 156 to move along a circumferential path indicated at 170.

The control module sensor 152 continuously senses the position of the magnet 156 and sends a signal to the controller 116 indicative of that position. In response, the controller 116 controls at least one fifth vehicle function 118e, e.g., the flash to pass signal and continuous high beams 118e. To this end, it will be appreciated that placing the magnet 156 in different positions along the path 170 can correspond with controlling the different fifth vehicle functions 118e.

For example, the stalk housing 26—and therefore the magnet 156—has a neutral position indicated at (1) in which all the fifth vehicle functions 118e are unactuated/off. The stalk housing 26 and control module housing 24 can include cooperating detent structure (not shown) that holds the stalk housing 26 in the neutral position (1) until a sufficient force is applied to the stalk housing in the manner $R_4$ to overcome the detent.

Pivoting the stalk housing 26 clockwise from the neutral position (1) in the manner $R_4$ moves the magnet 156 counterclockwise along the path 170 (as shown in FIG. 8C). When the stalk housing 26 reaches the position indicated at (6) in FIG. 8A, the controller 116 actuates the flash to pass signal 118e. The flash to pass signal 118e remains actuated as long as the stalk housing 26 is physically held in the position (6). If the stalk housing 26 is released, however, the stalk housing automatically returns to the neutral position (1) under a spring bias (not shown). The flash to pass signal 118e will be turned off when the stalk housing 26 moves out of the position (6).

Pivoting the stalk housing 26 counterclockwise in the manner $R_4$ moves the magnet 156 clockwise along the path 170 (as shown in FIG. 8C). When the stalk housing 26 reaches the position indicated at (7) in FIG. 8A, the controller 116 actuates the continuous high beams 118e. The stalk housing 26 and control module housing 24 can include cooperating detent structure (not shown) that holds the stalk housing 26 in the position (7) until a sufficient force is applied to the stalk housing in the counterclockwise direction to overcome the detent and allow the stalk assembly and rotor member to return to the neutral position (1). The continuous high beams 118e remain actuated until the stalk housing 26 is forcibly moved out of the position (7).

Referring back to FIG. 6, a second steering column control module 220 can be provided on the steering column switch housing 70 and secured therein by the cover 74 and fasteners 72. FIGS. 9-15C illustrate the components in and operation of the second steering column control module 220. The second steering column control module 220 is substantially similar to the steering column control module 20 shown in FIGS. 1-8C and described above. That said, each component in the second steering column control module 220 is given a reference number 200 higher than the corresponding component in the steering column control module 20 and the same nomenclature. A full description of every component of the second steering column control module 220 is omitted for brevity.

Figure 11:
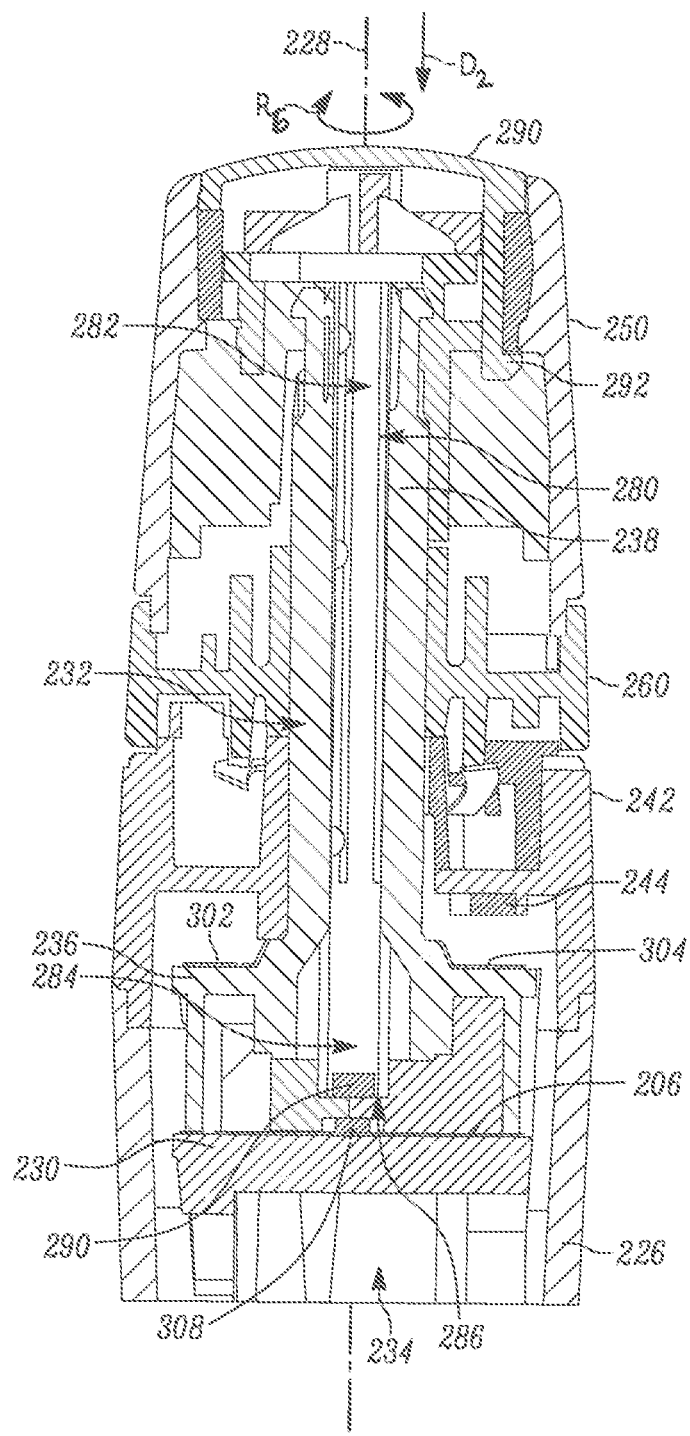
FIG. 11 is a section view of the stalk assembly of FIG. 9 taken along line 8-8.
Figure 12:
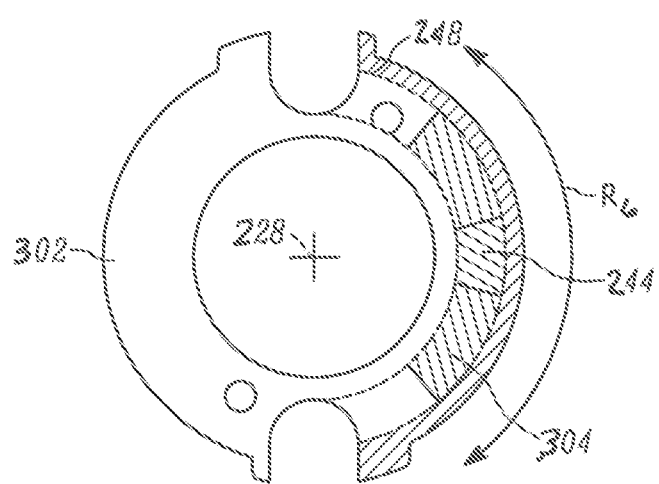
FIG. 12 is a section view of a portion of the stalk assembly of FIG. 9 taken along line 9-9.

Referring to FIGS. 11-12, rotating the first knob 242 about the axis 228 in the manner $R_6$ causes the magnet 242 to move along a circumferential path 248 relative to the first sensor 304. The first sensor 304 continuously senses the position of the magnet 244 along the path 248 and sends a signal to the controller 116 indicative of the position. In response, the controller 116 controls at least one sixth vehicle function 118f, e.g., the rear wiper. To this end, it will be appreciated that placing the magnet 244 in different positions along the path 248 can correspond with controlling the rear wiper 118f in different manners.

For example, the first knob 242—and therefore the magnet 244—has a neutral position shown in FIG. 12 in which the rear wiper 118f is unactuated/off. Rotating the first knob 242 counterclockwise from the neutral position in the manner $R_6$ moves the magnet 244 to the top end of the path 248 (as shown in FIG. 12). This causes the controller 116 to actuate the rear wiper 118f in intermittent mode.

Rotating the first knob 242 clockwise from the neutral position in the manner $R_6$ moves the magnet 244 to the bottom end of the path 248. This causes the controller 116 to actuate the rear wiper 118f in continuous mode. In each case, the spring detent 262 snap into detent structure in the ring member 260 when the first knob 242 reaches either end of the path 248 to maintain the first knob in place. This leaves the associated rear wiper 118f control function in an actuated condition. The bias of the spring detent 262 must be overcome to return the magnet 244 to the neutral position of FIG. 12 and turn off the rear wiper 118f.

Figure 13A:
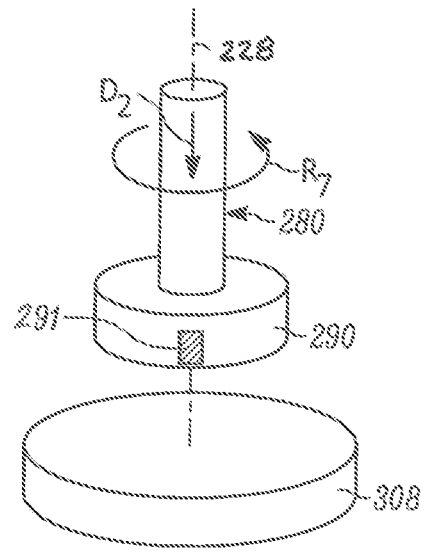
FIG. 13A is a schematic illustration of an enlarged portion of FIG. 11.

Referring to FIGS. 11 and 13A, the second sensor 308 continuously senses the axial position of the magnet 290 and sends signals to the controller 116 indicative of the position. In response, the controller 116 controls at least one seventh vehicle function 118g, e.g., automatic front and/or rear wipers or a driver information menu.

Pressing the button 296 in the manner $D_2$ to overcome the bias of the spring 306 moves the second shaft 280 axially toward the support member 230. This moves the magnet 290 secured to the second shaft 280 axially toward the second sensor 308, thereby reducing an axial gap or distance $g_2$ between the magnet 290 and the second sensor 308. When the gap $g_2$ is reduced to a predetermined value, the controller 116 actuates the front and rear wipers 118g in automatic mode. The front and rear wipers 118g remain actuated in automatic mode as long as the gap $g_2$ is at or below the predetermined value. The button 296 and second knob 250 can include cooperating detent structure (not shown) that holds the button and second knob at the predetermined gap $g_2$ value until the button is depressed to overcome the detent.

Depressing the button 290 again release the button detent and allows the spring plunger assembly 298 to extend and return the button to the neutral position shown in FIG. 11 while increasing the gap $g_2$ above the predetermined value. That said, the controller 116 turns off the automatic front and rear wipers 118g as soon as the gap $g_2$ exceeds the predetermined value.

Figure 13B:
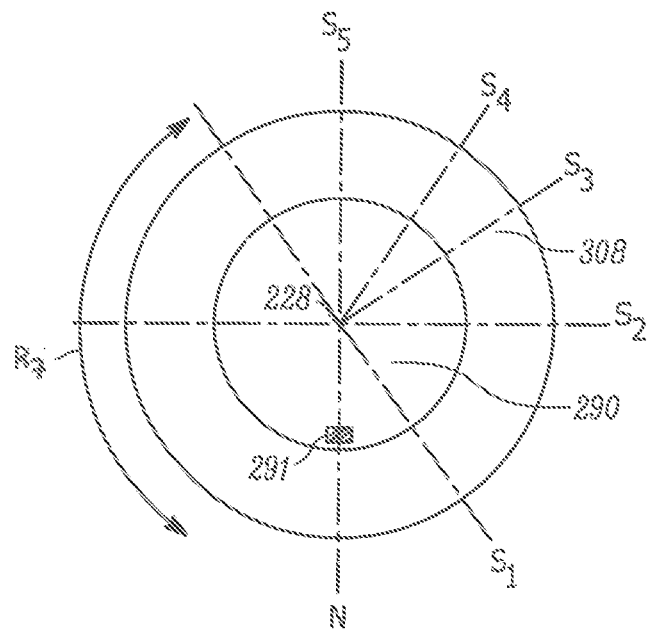
FIG. 13B is a schematic illustration of a top view of FIG. 13A.

Referring to FIGS. 13A-13B, rotating the second knob 250 about the axis 228 in the manner $R_7$ causes the magnet 290 to rotate relative to the second sensor 308. The second sensor 308 continuously senses the rotational position of the magnet 290 on the second shaft 280 and sends a signal to the controller 116 indicative of the rotational position. In response, the controller 116 controls at least one eighth vehicle function 118h, e.g., the front wipers. To this end, it will be appreciated that placing the magnet 290 in different angular positions relative to the second sensor 308 can correspond with controlling the front wipers 118h in different manners.

For example, the second knob 250—and therefore the magnet 290—has a neutral position N shown in FIG. 13B (indicia 291 are shown in FIGS. 13B-13C for clarity) in which the front wipers 118e is unactuated/off. The spring plunger assembly 266 snaps into a first recess (not shown) in the ring member 260 when the second knob 250 is in the neutral position N to maintain the second knob therein. This keeps the front wipers 118h off.

Rotating the second knob 250 counterclockwise from the neutral position N in the manner $R_7$ moves the magnet 290 in a counterclockwise direction relative to the second sensor 308 on the second portion 306. Once the indicia 291 reaches a first position $S_1$ the controller 116 actuates the front wipers 118h in a first intermittent mode. The spring plunger assembly 266 snaps into a second recess (not shown) in the ring member 260 when the second knob 250 reaches the first position $S_1$ to maintain the second knob therein. This keeps the front wipers 118h on in the first intermittent mode.

Rotating the second knob 250 counterclockwise from the first position $S_1$ in the manner $R_7$ until the magnet 290 reaches a second position $S_2$ causes the controller 116 to switch the front wipers 118h from the first intermittent mode to a second, faster intermittent mode. The spring plunger assembly 266 snaps into a third recess (not shown) in the ring member 260 when the second knob 250 reaches the second position $S_2$ to maintain the second knob therein. This keeps the front wipers 118h on in the second intermittent mode.

Rotating the second knob 250 counterclockwise from the second position $S_2$ in the manner $R_7$ until the magnet 290 reaches a third position $S_3$ causes the controller 116 to switch the front wipers 118h from the second intermittent mode to a third intermittent mode faster than the second intermittent mode. The spring plunger assembly 266 snaps into a fourth recess (not shown) in the ring member 260 when the second knob 250 reaches the third position $S_3$ to maintain the second knob therein. This keeps the front wipers 118h on in the third intermittent mode.

Rotating the second knob 250 counterclockwise from the third position $S_3$ in the manner $R_7$ until the magnet 290 reaches a fourth position $S_4$ causes the controller 116 to switch the front wipers 118h from the third intermittent mode to a fourth intermittent mode faster than the third intermittent mode. The spring plunger assembly 266 snaps into a fifth recess (not shown) in the ring member 260 when the second knob 250 reaches the fourth position $S_4$ to maintain the second knob therein. This keeps the front wipers 118h on in the fourth intermittent mode.

Rotating the second knob 250 counterclockwise from the fourth position $S_4$ in the manner $R_7$ until the magnet 290 reaches a fifth position $S_5$ causes the controller 116 to switch the front wipers 118h from the fourth intermittent mode to a low, continuous mode. The spring plunger assembly 266 snaps into a sixth recess (not shown) in the ring member 260 when the second knob 250 reaches the fifth position $S_5$ to maintain the second knob therein. This keeps the front wipers 118h on in the low, continuous mode.

Rotating the second knob 250 counterclockwise from the fifth position $S_5$ in the manner $R_7$ until the magnet 290 reaches a sixth position $S_6$ causes the controller 116 to switch the front wipers 118h from the low, continuous mode to a high, continuous mode. The spring plunger assembly 266 snaps into a seventh recess (not shown) in the ring member 260 when the second knob 250 reaches the sixth position $S_6$ to maintain the second knob therein. This keeps the front wipers 118h on in the high, continuous mode.

The second knob 250 can be rotated in a clockwise direction from any of the positions $S_1$-$S_6$ in the manner $R_7$ when the bias of the spring plunger assembly 266 associated that position is overcome. The second knob 250 can then be placed in a different position $S_1$-$S_6$ or returned to the neutral position N, which turns the front wipers 118h off.

It will be appreciated that the different front wiper 118h modes can be associated with different positions $S_1$-$S_6$ or that more or fewer wiper modes and/or positions can be provided. Regardless, the second sensor 308 continuously senses the rotational position of the magnet 290 and sends signals to the controller 116 to control the front wipers 118h in the desired manner.

Figure 14A:
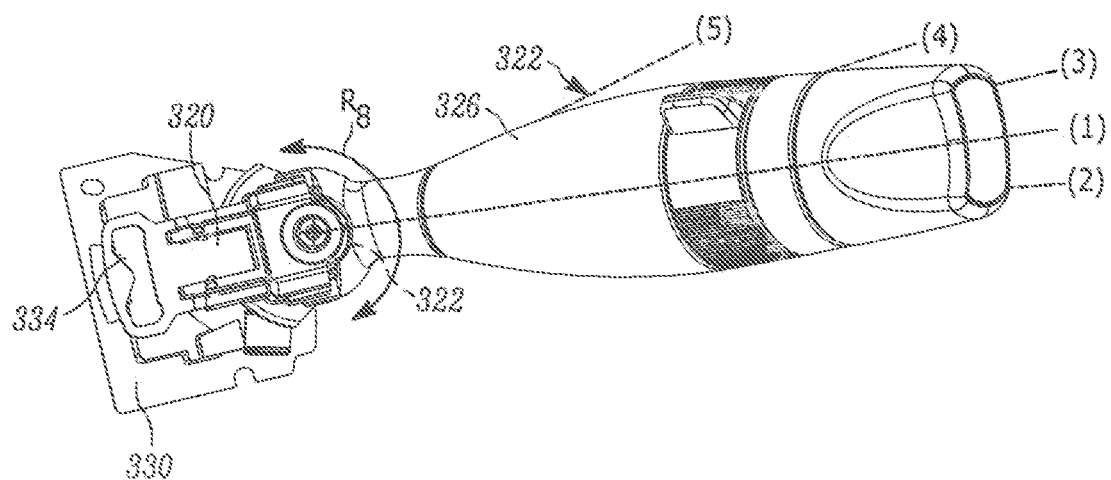
FIG. 14A is a side view of the stalk assembly of FIG. 9 through a first range of motion.
Figure 14B:
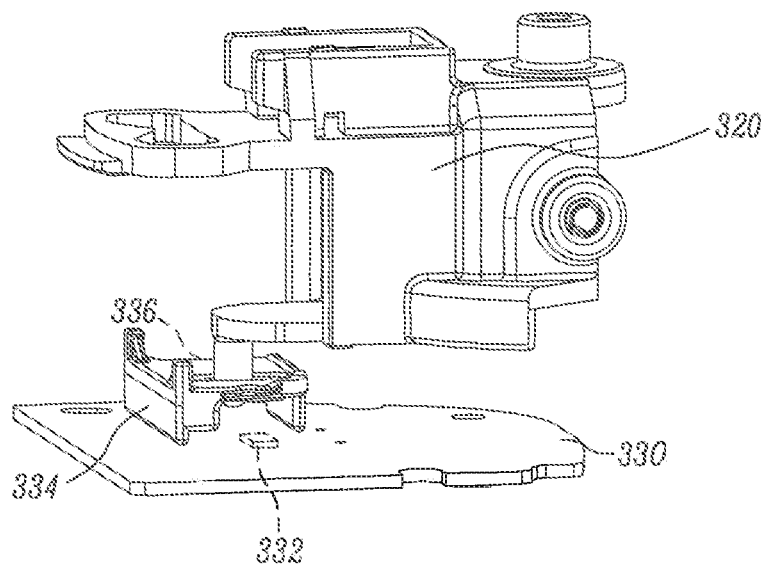
FIG. 14B is an enlarged view of a portion of FIG. 14A.
Figure 14C:
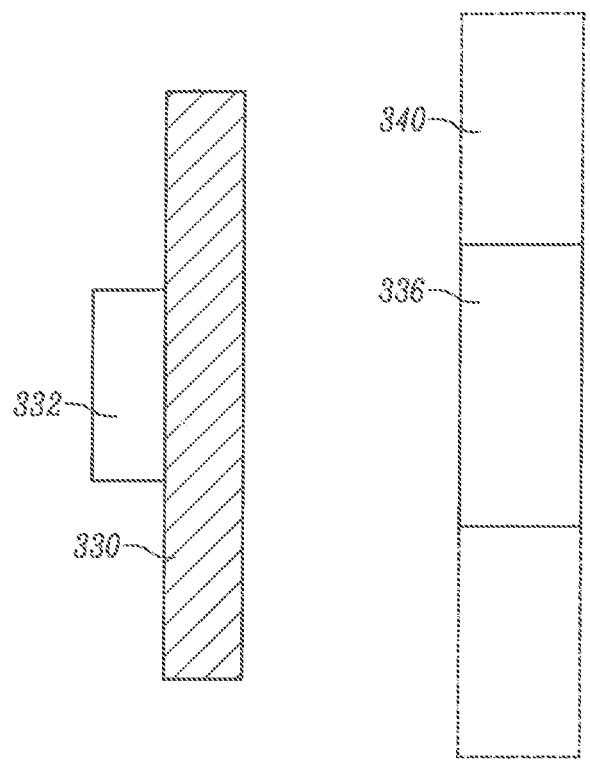
FIG. 14C is a schematic illustration of a first operation of the stalk assembly of FIG. 9.

Referring to FIGS. 14A-14C, the carrier member 334 is connected to the rotor member 320 such that pivotable movement of the stalk housing 266 and rotor member 320 in the manner $R_8$ causes the carrier member to slide across the PCB 330. This results in the magnet 336 moving along a linear path indicated at 340. The control module sensor 332 continuously senses the position of the magnet 336 and sends a signal to the controller 116 indicative of the position. In response, the controller 116 controls at least one ninth vehicle function 118i, e.g., front wiper mist mode, front wiper intermittent mode, front wiper low, continuous mode, and front wiper high, continuous mode.

For example, the stalk housing 266 and rotor member 320—and therefore the magnet 336—has a neutral position indicated at (1) in which the ninth vehicle functions 118i are unactuated/off. The rotor member 320 and control module housing 226 can include cooperating detent structure (not shown) that holds the stalk housing 226 and rotor member 320 in the neutral position (1) until a sufficient force is applied to the stalk housing in the manner $R_8$ direction to overcome the detent.

Pivoting the stalk housing 266 and rotor member 320 clockwise from the neutral position (1) in the manner $R_8$ moves the magnet 336 downwards along the path 340 (as shown in FIG. 14C). When the stalk housing 266 and rotor member 320 reach the position indicated at (2) in FIG. 14A, the controller 116 actuates the front wiper mist mode 118*i*. The front wiper mist mode 118*i* remains actuated as long as the stalk housing 26 is physically held in the position (2). If the stalk housing 266 is released, however, the stalk housing and rotor member 320 automatically return to the neutral position (1) under a spring bias (not shown). The front wiper mist mode 118*i* will be turned off when the stalk housing 266 moves out of the position (2).

Pivoting the stalk housing 266 and rotor member 320 counterclockwise from the position (2) in the manner $R_8$ to the position indicated at (3) causes the controller 116 to turn off the front wiper mist mode 118*i* and actuate the front wiper intermittent mode 118*i*. The rotor member 320 and control module housing 246 can include cooperating detent structure (not shown) that holds the stalk housing 266 and rotor member 320 in the position (3) until a sufficient force is applied to the stalk housing in the clockwise direction to overcome the detent and allow the stalk assembly and rotor member to move in the manner $R_8$. The front wiper intermittent mode 118*i* remains actuated until the stalk housing 266 and rotor member 320 are forcibly moved out of the position (3).

Pivoting the stalk housing 266 and rotor member 320 counterclockwise from the position (3) in the manner $R_8$ to the position indicated at (4) causes the controller 116 to turn off the front wiper intermittent mode 118*i* and actuate the front wiper low, continuous mode 118*i*. The rotor member 320 and control module housing 246 can include cooperating detent structure (not shown) that holds the stalk housing 266 and rotor member 320 in the position (4) until a sufficient force is applied to the stalk housing in the clockwise direction to overcome the detent and allow the stalk assembly and rotor member to move in the manner $R_8$. The front wiper low, continuous mode 118*i* remains actuated until the stalk housing 266 and rotor member 320 are forcibly moved out of the position (4).

Pivoting the stalk housing 266 and rotor member 320 counterclockwise from the position (4) in the manner $R_8$ to the position indicated at (5) causes the controller 116 to turn off the front wiper low, continuous mode 118*i* and actuate the front wiper high, continuous mode 118*i*. The rotor member 320 and control module housing 246 can include cooperating detent structure (not shown) that holds the stalk housing 266 and rotor member 320 in the position (5) until a sufficient force is applied to the stalk housing in the clockwise direction to overcome the detent and allow the stalk assembly and rotor member to move in the manner $R_8$. The front wiper high, continuous mode 118*i* remains actuated until the stalk housing 266 and rotor member 320 are forcibly moved out of the position (5). It will be appreciated that the stalk housing 266 and rotor member 320 can be pivoted to and between any position(s) (1)-(5), as needed.

Figure 15A:
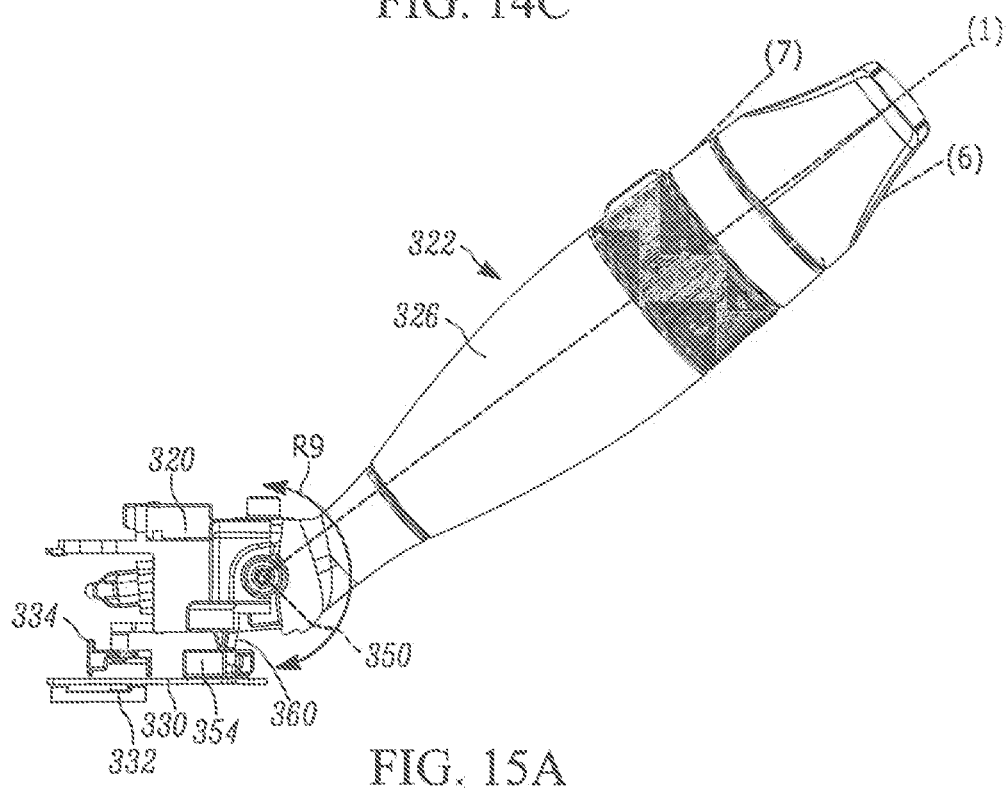
FIG. 15A is a side view of the stalk assembly of FIG. 1 through a second range of motion.
Figure 15B:
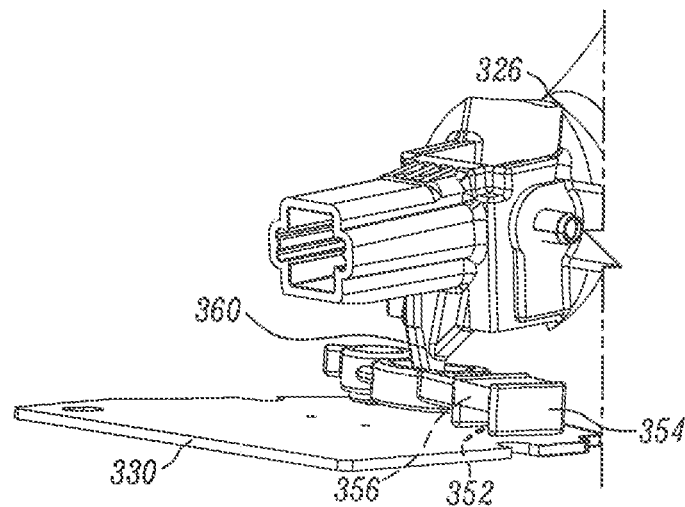
FIG. 15B is an enlarged view of a portion of FIG. 15A.
Figure 15C:
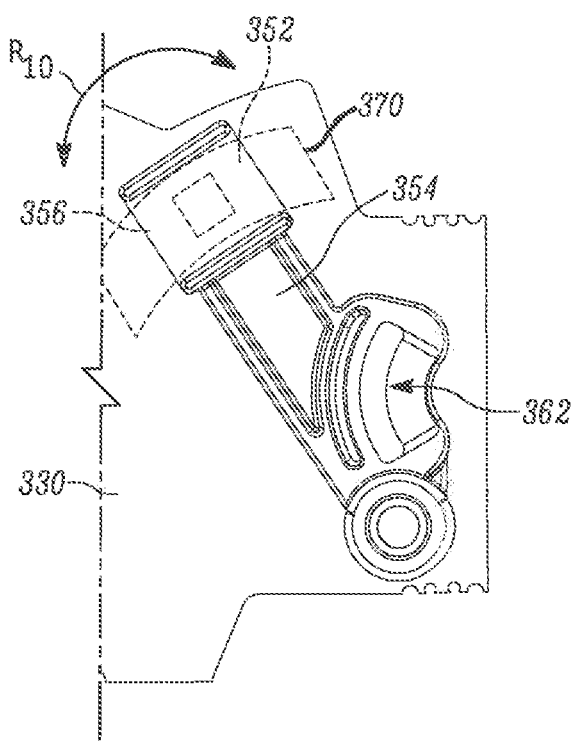
FIG. 15C is a schematic illustration of a second operation of the stalk assembly of FIG. 9.

Referring to FIGS. 15A-15C, the carrier member 354 is connected to the stalk housing 266 such that pivotable movement of the stalk housing in the manner $R_9$ causes the carrier member to pivot about the PCB 330 in the manner $R_{10}$ (FIG. 15C). This, in turn, causes the magnet 356 to move along a circumferential path indicated at 370. The control module sensor 352 continuously senses the position of the magnet 356 and sends a signal to the controller 116 indicative of that position. In response, the controller 116 controls at least one tenth vehicle function 118*j*, e.g., front wiper wash and wipe mode or rear wiper wash and wipe mode. To this end, it will be appreciated that placing the magnet 356 in different positions along the path 370 can correspond with controlling the different wash and wipe modes 118*j*.

For example, the stalk housing 266—and therefore the magnet 336—has a neutral position indicated at (1) in which both the front and rear wiper wash and wipe mode 118*j* are unactuated/off. The stalk housing 226 and control module housing 224 can include cooperating detent structure (not shown) that holds the stalk housing 226 in the neutral position (1) until a sufficient force is applied to the stalk housing in the manner $R_9$ to overcome the detent.

Pivoting the stalk housing 266 clockwise from the neutral position (1) in the manner $R_9$ moves the magnet 356 counterclockwise along the path 370 (as shown in FIG. 15C). When the stalk housing 266 reaches the position indicated at (6) in FIG. 15A, the controller 116 actuates the rear wiper wash and wipe mode 118*j*. The rear wiper wash and wipe mode 118*j* remains actuated as long as the stalk housing 266 is physically held in the position (6). If the stalk housing 266 is released, however, the stalk housing automatically returns to the neutral position (1) under a spring bias (not shown). The rear wiper wash and wipe mode 118*j* will be turned off when the stalk housing 266 moves out of the position (6).

Pivoting the stalk housing 266 counterclockwise from the neutral position (1) in the manner $R_9$ moves the magnet 356 clockwise along the path 370 (as shown in FIG. 15C). When the stalk housing 266 reaches the position indicated at (7) in FIG. 15A, the controller 116 actuates the front wiper wash and wipe mode 118*j*. The front wiper wash and wipe mode 118*j* remains actuated as long as the stalk housing 266 is physically held in the position (7). If the stalk housing 266 is released, however, the stalk housing automatically return to the neutral position (1) under spring bias (not shown). The front wiper wash and wipe 118*j* will be turned off when the stalk housing 266 moves out of the position (7).

Figure 16:
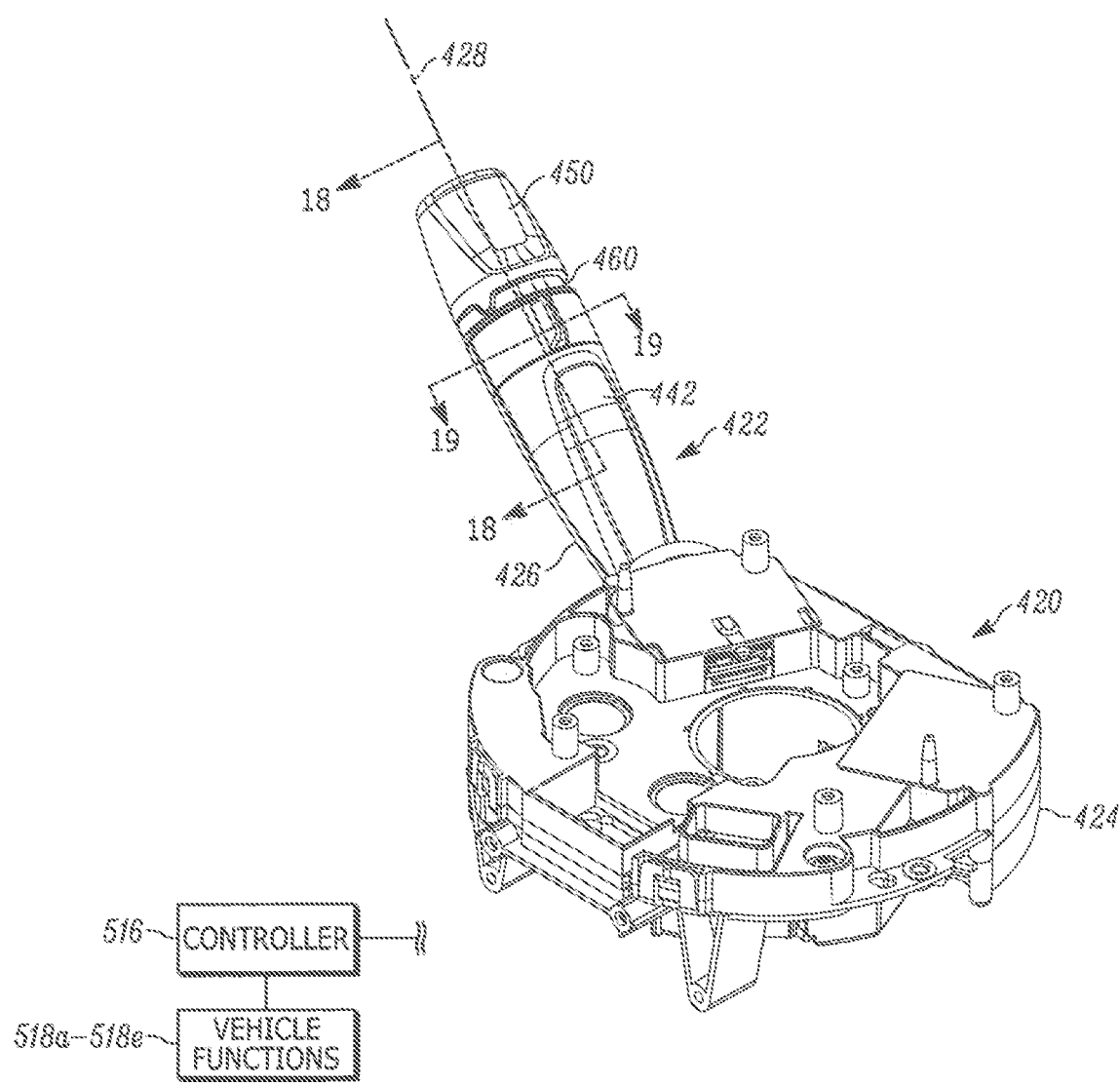
FIG. 16 is a side view of an example third steering column control module.

FIG. 16 illustrates a third example steering column control module 420 that can be provided on a control module housing 424. The control module housing 424 can be the steering column switch housing (as shown) or be incorporated into a steering column switch housing. FIGS. 16-23C illustrate the components and operation of the third steering column control module 420. The third steering column control module 420 is substantially similar to the steering column control module 20 shown in FIGS. 1-8C and described above. That said, each component in the third steering column control module 420 is given a reference number 400 higher than the corresponding component in the steering column control module 20 and the same nomenclature. A full description of every component of the second steering column control module 420 is omitted for brevity.

Figure 17:
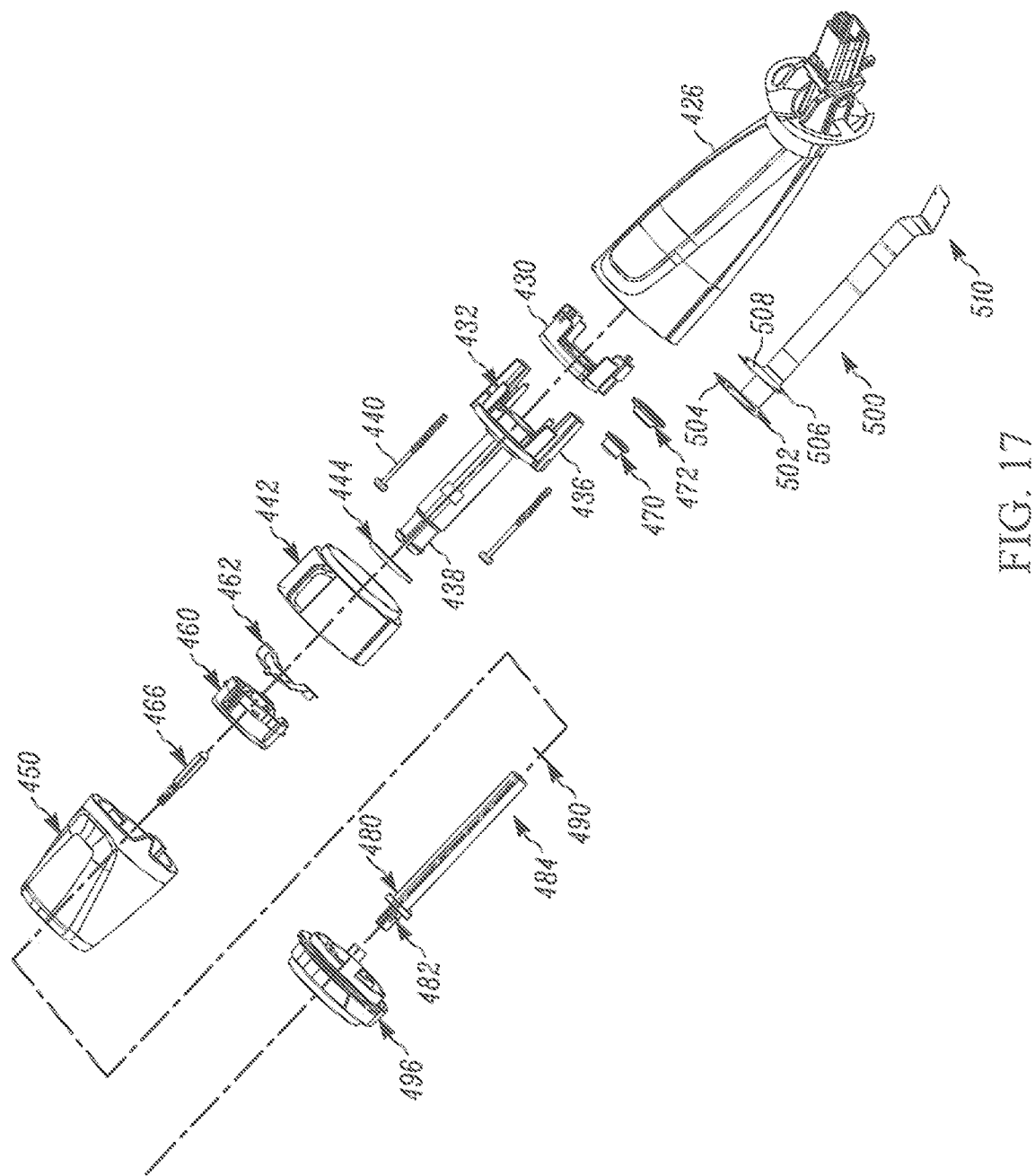
FIG. 17 is an exploded view of a stalk assembly of the third steering column control module of FIG. 16.

Referring to FIG. 17, the stalk assembly 422 in the third steering column control module 420 includes a bearing cap 476 and elastomer pad 478—instead of a spring—for controlling axial movement of the second shaft 480. More specifically, the bearing cap 476 receives the second end 484 of the second shaft 480. The elastomeric pad 478 is hollow or has a cavity such that the elastomeric pad abuts the second portion 506 and forms a cover or shroud over the second sensor 508. The bearing cap 476 abuts the elastomeric pad 478. The elastomeric pad 478 is resilient and biases the second shaft 480 away from the support member 430 such that the button 496 has the initial position shown in FIG. 18. The elastomer pad 478 can provide haptic feedback when pressing the button 496.

Figure 18:
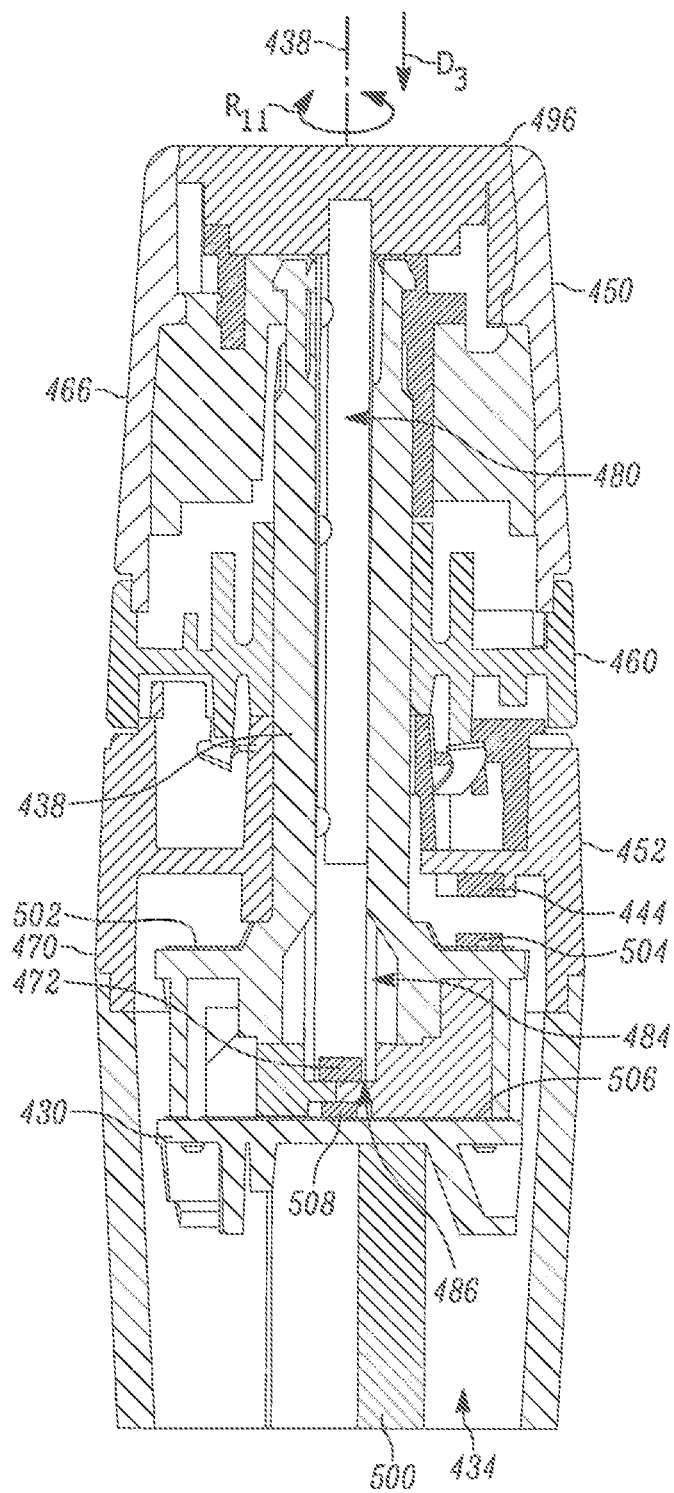
FIG. 18 is a section view of the stalk assembly of FIG. 18 taken along line 18-18.
Figure 19:
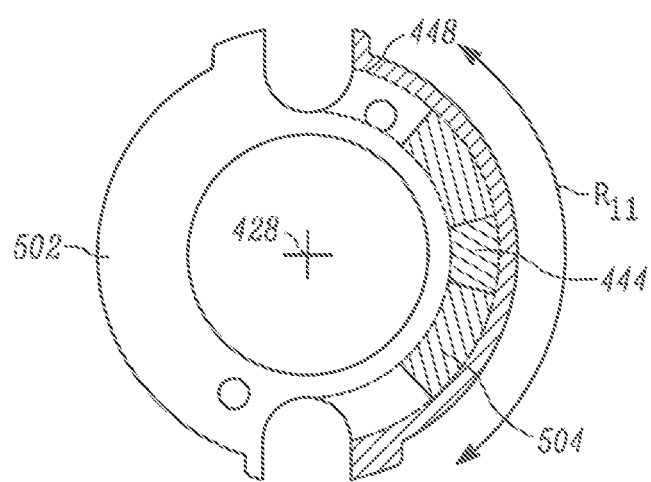
FIG. 19 is a section view of a portion of the stalk assembly of FIG. 19 taken along line 19-19.

Referring to FIGS. 18-19, rotating the first knob 442 about the axis 428 in the manner $R_{11}$ causes the magnet 442 to move along a circumferential path 448 relative to the first sensor 504. The first sensor 504 continuously senses the position of the magnet 444 along the path 448 and sends a signal to the controller 516 indicative of the position. In response, the controller 516 controls at least one eleventh vehicle function 518k, e.g., the rear wiper. To this end, it will be appreciated that placing the magnet 444 in different positions along the path 448 can correspond with controlling the rear wiper 518k in different manners.

For example, the first knob 442—and therefore the magnet 444—has a neutral position shown in FIG. 19 in which the rear wiper 518k is unactuated/off. Rotating the first knob 442 counterclockwise from the neutral position in the manner $R_{11}$ moves the magnet 444 to the top end of the path 448 (as shown in FIG. 19). This causes the controller 516 to actuate the rear wiper 518k in intermittent mode.

Rotating the first knob 442 clockwise from the neutral position in the manner $R_{11}$ moves the magnet 444 to the bottom end of the path 448. This causes the controller 516 to actuate the rear wiper 518k in continuous mode. In each case, the spring detent 462 cooperates with the detent structure (not shown) on the ring member 460 when the first knob 442 reaches either end of the path 448 to maintain the first knob in place. This leaves the associated rear wiper 518k control function in an actuated condition. The bias of the spring detent 462 must be overcome to return the magnet 444 to the neutral position of FIG. 19 and turn off the rear wiper 518k.

Figure 20A:
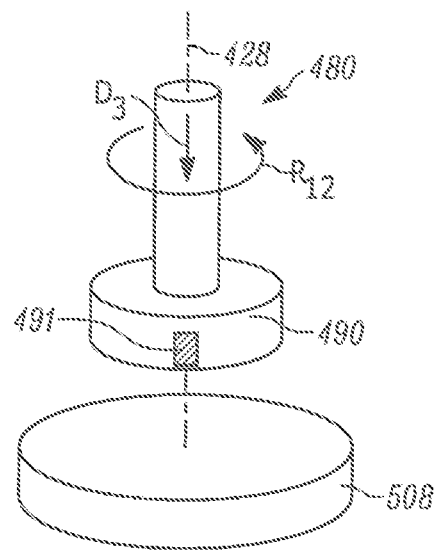
FIG. 20A is a schematic illustration of an enlarged portion of FIG. 18.

Referring to FIGS. 18 and 20A, the second sensor 508 continuously senses the axial position of the magnet 490 and sends signals to the controller 516 indicative of the position. In response, the controller 516 controls at least one twelfth vehicle function 518m, e.g., front wiper mist and wash/wipe mode. Pressing the button 496 in the manner $D_3$ to overcome the bias of the elastomeric pad 478 moves the second shaft 480 axially toward the support member 430. This moves the magnet 490 secured to the second shaft 480 axially toward the second sensor 508, thereby reducing an axial gap or distance $g_3$ between the magnet 490 and the second sensor 508. When the gap $g_3$ is reduced to a predetermined value, the controller 516 actuates the front wiper mist and wash/wipe mode 518f. The front wiper mist and wash/wipe mode 118f remains actuated as long as the gap $g_3$ is at or below the predetermined value.

Releasing the button 490 allows the elastomeric pad 478 to extend/expand and return the button to the neutral position shown in FIG. 18 while increasing the gap $g_3$ above the predetermined value. That said, the controller 516 turns off the front wiper mist and wash/wipe mode 518k as soon as the gap $g_3$ exceeds the predetermined value.

Figure 20B:
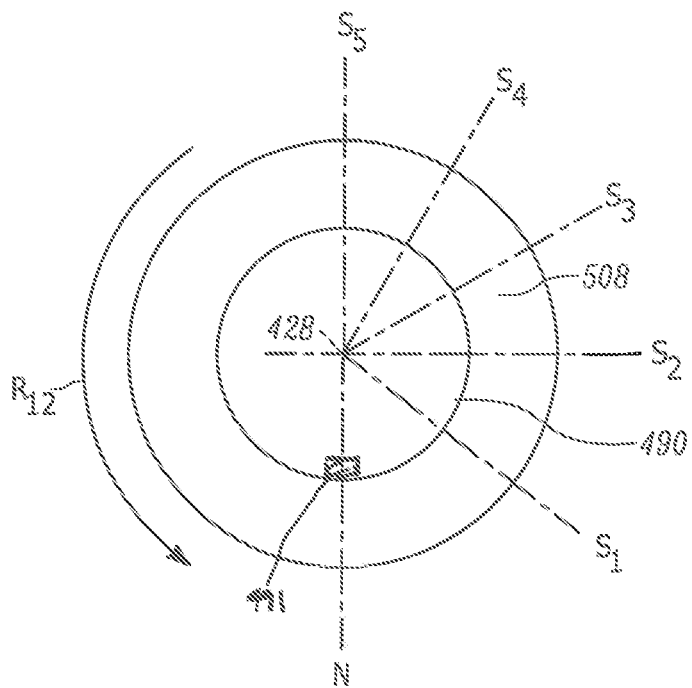
FIG. 20B is a schematic illustration of a top view of FIG. 18.
Figure 21:
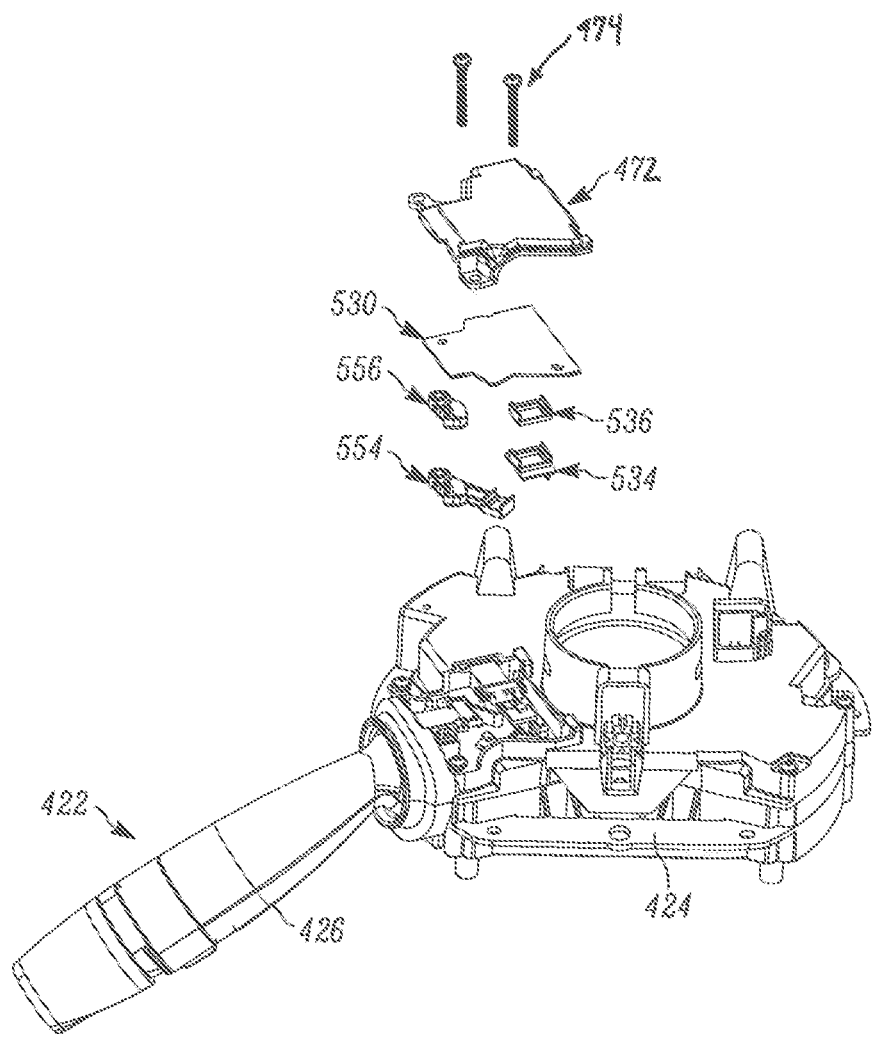
FIG. 21 is an exploded view of a carrier assembly including the third steering column control module of FIG. 16.

Referring to FIGS. 20A-20B, rotating the second knob 450 about the axis 428 in the manner $R_{12}$ causes the magnet 490 to rotate relative to the second sensor 508. The second sensor 508 continuously senses the rotational position of the magnet 490 on the second shaft 480 and sends a signal to the controller 516 indicative of the rotational position. In response, the controller 516 controls at least one thirteenth vehicle function 518n, e.g., the front wiper. To this end, it will be appreciated that placing the magnet 490 in different angular positions relative to the second sensor 508 can correspond with controlling the front wipers 518n in different manners.

In one example, the second knob 450 has the same positions (1)-(6)—with the same corresponding front wiper functions/modes—as the second knob 50 in FIGS. 13A-13C. Consequently, operation of the second knob 450 rotating has been omitted for brevity. It will be appreciated that the different front wiper 518n modes can be associated with different positions $S_1$-$S_6$ or that more or fewer wiper modes and/or positions can be provided. Regardless, the second sensor 508 continuously senses the rotational position of the magnet 490 and sends signals to the controller 516 to control the front wipers 518n in the desired manner.

Figure 22A:
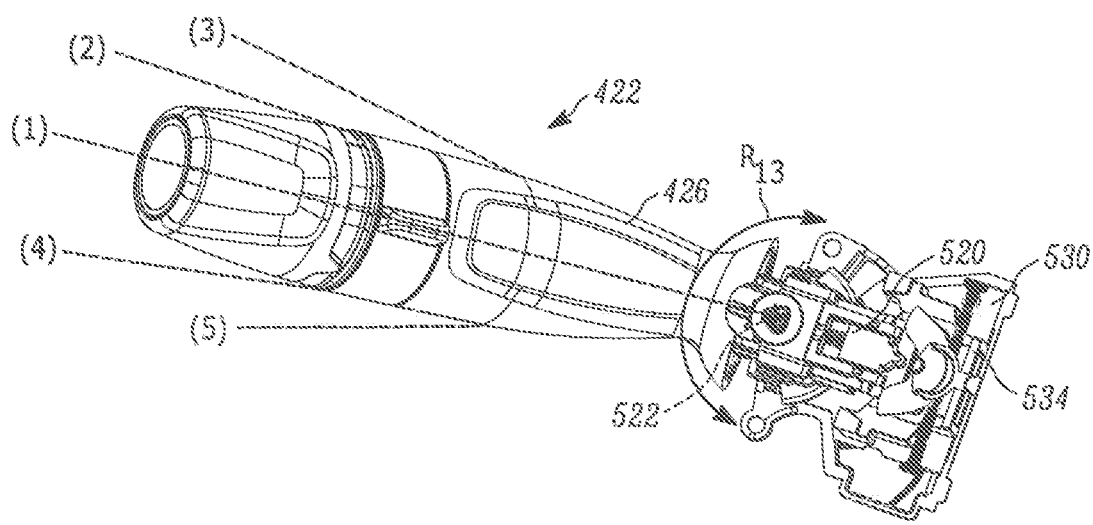
FIG. 22A is a side view of the stalk assembly of FIG. 16 through a first range of motion.
Figure 22B:
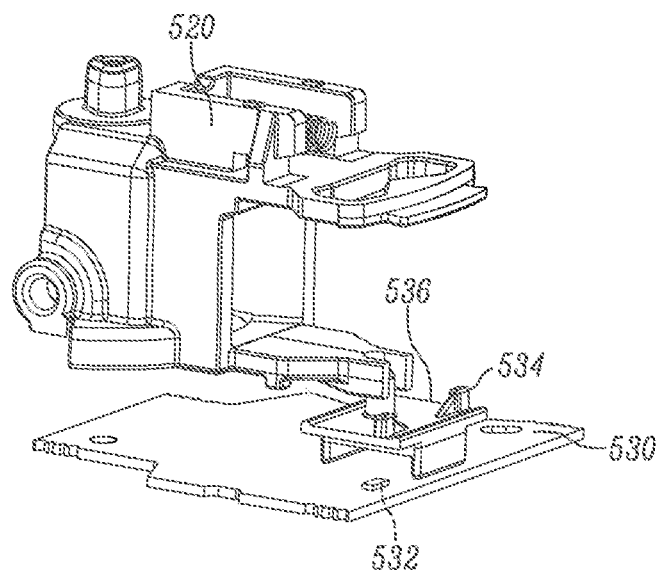
FIG. 22B is an enlarged view of a portion of FIG. 21A.
Figure 22C:
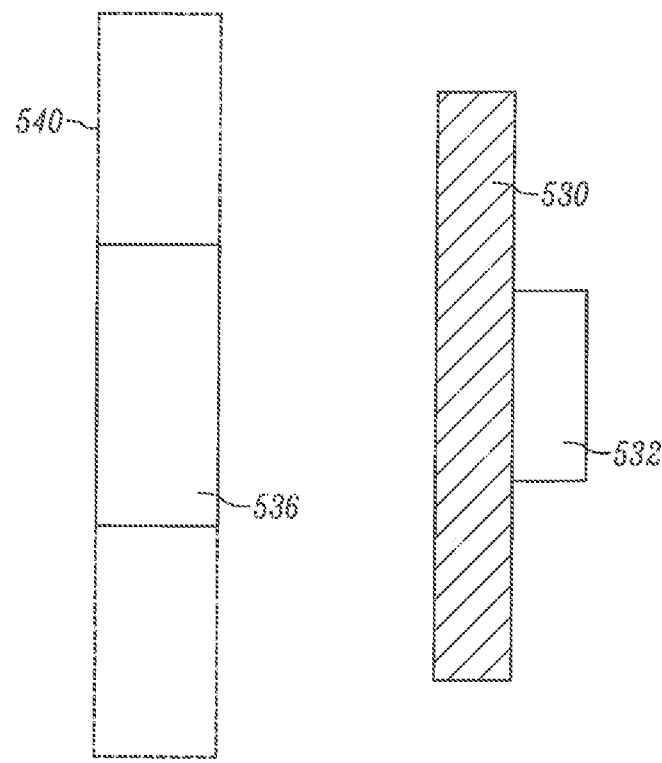
FIG. 22C is a schematic illustration of a first operation of the stalk assembly of FIG. 16.

Referring to FIGS. 22A-22C, the carrier member 534 is connected to the rotor member 520 such that pivotable movement of the stalk housing 426 and rotor member in the manner $R_{13}$ causes the carrier member to slide across the PCB 530. This results in the magnet 536 moving along a linear path indicated at 540. The control module sensor 532 continuously senses the position of the magnet 536 and sends a signal to the controller 516 indicative of that position. In response, the controller 516 controls at least one fourteenth vehicle function 518o, e.g., the left turn signal, right turn signal, left lane change signal, and right lane change signal. To this end, it will be appreciated that placing the magnet 536 in different positions along the path 540 can correspond with controlling different fourteenth vehicle functions 5180.

In one example, the stalk housing 426 and rotor member 520 have the same positions (1)-(5)—with the same corresponding left and right turn signals and lane change signals—as the stalk housing 26 and rotor member 120 in FIGS. 7A-7C. Consequently, operation of the stalk housing 426 and rotor member 520 rotating together has been omitted for brevity.

Figure 23A:
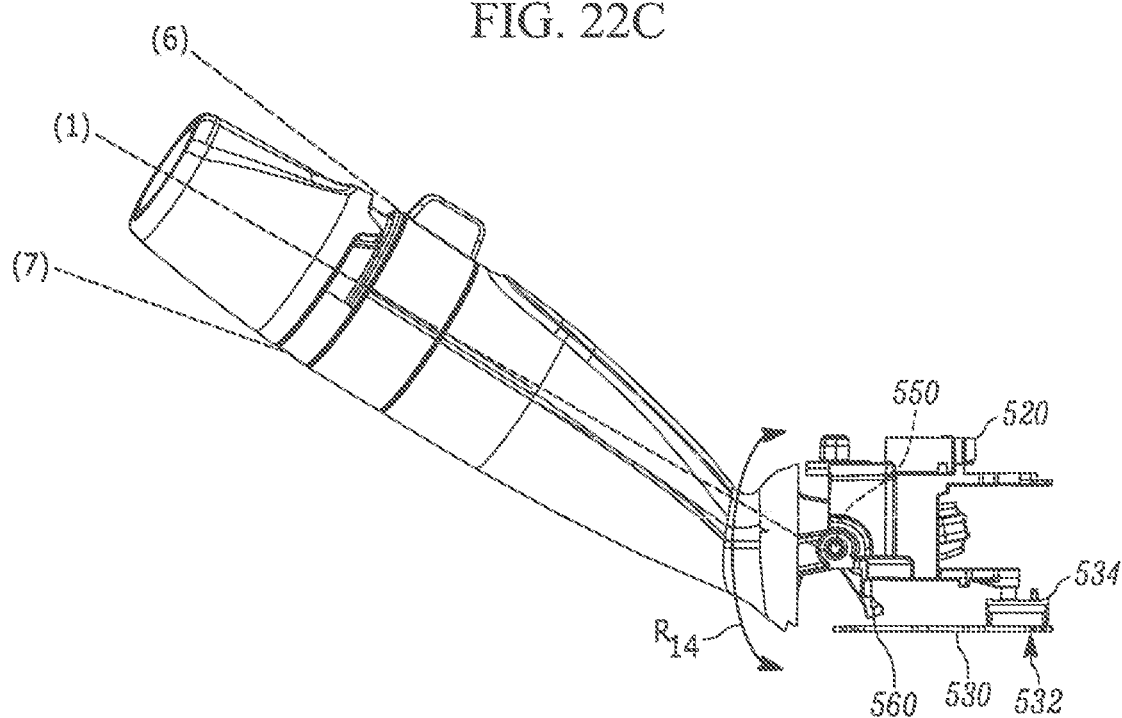
FIG. 23A is a side view of the stalk assembly of FIG. 1 through a second range of motion.
Figure 23B:
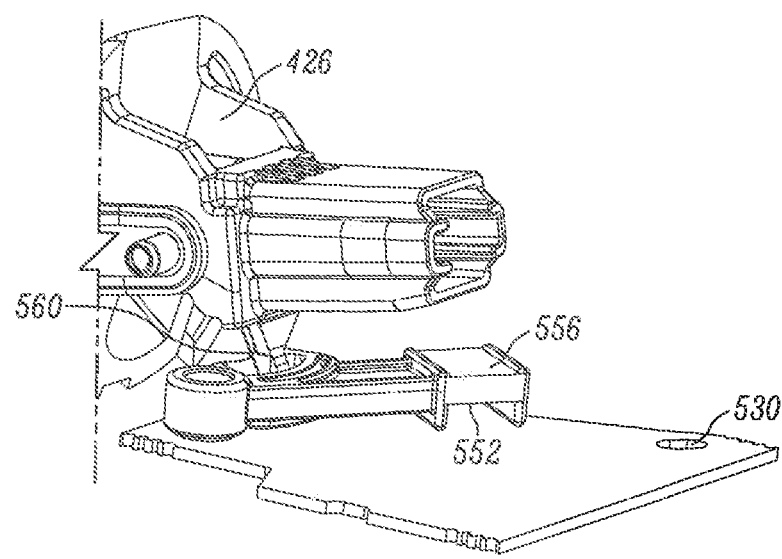
FIG. 23B is an enlarged view of a portion of FIG. 23A.
Figure 23C:
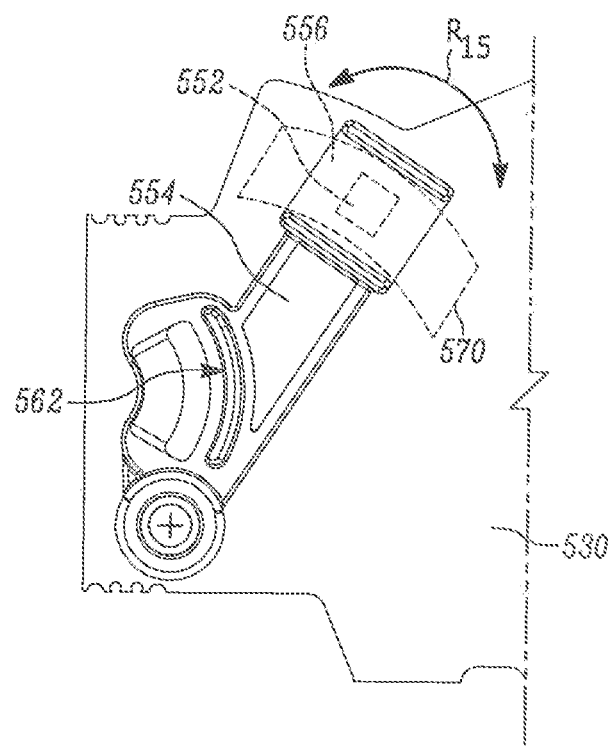
FIG. 23C is a schematic illustration of a second operation of the stalk assembly of FIG. 16.

Referring to FIGS. 23A-23C, the stalk housing 426 is pivotable relative to the rotor member 520 about a second axis 550 in the manner $R_{14}$ (FIG. 23A). The carrier member 554 is pivotably connected to the PCB 530 and slidable along/relative thereto. The carrier member 554 is connected to the stalk housing 426 such that pivotable movement of the stalk housing in the manner $R_{14}$ causes the carrier member to pivot about the PCB 530 in the manner $R_{15}$ (FIG. 23C). This results in the magnet 536 moving along a circumferential path indicated at 570.

The control module sensor 552 continuously senses the position of the magnet 556 and sends a signal to the controller 516 indicative of that position. In response, the controller 116 controls at least one fifteenth vehicle function 518p, e.g., the flash to pass signal and continuous high beams. In one example, the stalk housing 426 has the same positions (6)-(7)—with the same corresponding vehicle functions—as the stalk housing 26 and rotor member 120 in FIGS. 7A-7C. Consequently, operation of the stalk housing 426 rotating relative to the rotor member 520 has been omitted for brevity.

It be appreciated that the stalk housings, knobs, and buttons described herein on the steering column control modules described and shown can be configured to control any combination of not only the vehicle functions described herein but any alternative/additional vehicle functions, e.g., cruise control, radio control, vehicle HVAC, camera or sensor systems, etc. known to those skilled in the art. Regardless of the vehicle functions controlled, sensors continuously monitor the positions of magnets along various paths, e.g., axial, linear, arcuate, circumferential, and provide signals to the controller indicative of those positions in order to control the desired vehicle function(s).

From the above description of the invention, those skilled in the art will perceive improvements, changes and modifications. For example, it is contemplated that the stalks or levers may control any desired functions of the vehicle. Such improvements, changes and modifications within the skill of the art are intended to be covered by the appended claims.

Having described the invention, the following is claimed:

1. A steering column control module comprising:
a stalk assembly pivotably connected to a control module housing;
a printed circuit board;
a carrier member movable by the stalk assembly so as to slide across the printed circuit board;
a plurality of magnets connected to and movable by the stalk assembly, at least one of the magnets being provided on the carrier member;
a plurality of sensors for sensing the positions of the plurality of magnets and sending signals indicating the positions of the magnets; and
a controller for receiving the signals to control vehicle functions.

2. The steering column control module recited in claim 1, wherein one of the sensors senses movement of one of the magnets along a circumferential path in response to the carrier member sliding across the printed circuit board and sends signals to the controller indicating the position of the one magnet to control one of the vehicle functions.

3. The steering column control module recited in claim 1, wherein one of the sensors senses movement of one of the magnets along a circumferential path in response to the carrier member sliding across the printed circuit board and sends signals to the controller indicating the position of the one magnet to control one of the vehicle functions in multiple manners.

4. The steering column control module recited in claim 1, wherein one of the sensors senses movement of one of the magnets along an axis of the stalk assembly and sends signals to the controller indicating the position of the one magnet to control one of the vehicle functions.

5. The steering column control module recited in claim 1, wherein one of the sensors senses linear movement of one of the magnets in response to the carrier member sliding across the printed circuit board and sends signals to the controller indicating the position of the one magnet to control one of the vehicle functions.

6. The steering column control module recited in claim 1, wherein one of the sensors senses linear movement of one of the magnets in response to the carrier member sliding across the printed circuit board and sends signals to the controller indicating the position of the one magnet to control one of the vehicle functions in multiple manners.

7. The steering column control module recited in claim 1, wherein the sensors are Hall effect sensors.

8. The steering column control module recited in claim 1, wherein first and second sensors of the plurality of sensors are provided on a cable assembly connected to the controller.

9. The steering column control module recited in claim 8, wherein the first and second sensors are positioned within the stalk assembly.

10. The steering column control module recited in claim 1, wherein one of the sensors senses an axial position and a rotational position of one of the magnets and sends signals to the controller indicating the axial and rotational positions for controlling multiple of the vehicle functions.

11. The steering column control module recited in claim 1, wherein at least one of the plurality of magnets is moved by pivoting the stalk assembly relative to the control module housing.

12. The steering column control module recited in claim 1, wherein at least one of the plurality of magnets is moved by rotating a knob of the stalk assembly.

13. The steering column control module recited in claim 1, wherein at least one of the plurality of magnets is moved by pushing a button of the stalk assembly.

14. The steering column control module recited in claim 1, wherein the sensors continuously sense the positions of the magnets.

15. A steering column control module comprising:
a stalk assembly extending longitudinally along an axis and pivotably connected to a control module housing;
first and second magnets connected to and movable by the stalk assembly;
a cable assembly extending into and along the length of the stalk assembly and including a plurality of portions positioned along the length of the stalk assembly outside of the control module housing;
first and second sensors provided on the plurality of portions of the cable assembly for continuously sensing the positions of the first and second magnets and sending signals indicating the positions of the magnets; and
a controller for receiving the signals to control vehicle functions.

16. The steering column control module recited in claim 15, wherein the first sensor senses movement of the first magnet along a circumferential path and sends signals to the controller indicating the position of the first magnet to control one of the vehicle functions.

17. The steering column control module recited in claim 15, wherein the first sensor senses movement of the first magnet along a circumferential path and sends signals to the controller indicating the position of the first magnet to control one of the vehicle functions in multiple manners.

18. The steering column control module recited in claim 15, wherein the second sensor senses an axial position and a rotational position of the second magnet and sends signals to the controller indicating the axial and rotational positions for controlling multiple of the vehicle functions.

19. The steering column control module recited in claim 15, wherein the sensors are Hall effect sensors.

20. The steering column control module recited in claim 15, wherein the first and second sensors are movable with the stalk assembly in response to pivoting of the stalk assembly relative to the control module housing.

* * * * *